(12) United States Patent
Niikawa et al.

(10) Patent No.: US 6,834,130 B1
(45) Date of Patent: Dec. 21, 2004

(54) IMAGE RETRIEVAL SYSTEM FOR RETRIEVING A PLURALITY OF IMAGES WHICH ARE RECORDED IN A RECORDING MEDIUM, AND A METHOD THEREOF

(75) Inventors: Masahito Niikawa, Sakai (JP); Kenji Nakamura, Takatsuki (JP); Yasuhiro Morimoto, Takatsuki (JP); Katsuyuki Nanba, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/251,404

(22) Filed: Feb. 17, 1999

(30) Foreign Application Priority Data

Feb. 18, 1998 (JP) ............................................ 10-036464
Feb. 18, 1998 (JP) ............................................ 10-036465
Feb. 18, 1998 (JP) ............................................ 10-036466

(51) Int. Cl.$^7$ .............................. G06K 9/60; H04N 5/76; H04N 3/20
(52) U.S. Cl. ....................... 382/305; 382/307; 382/306; 348/231.99; 348/231.2; 348/174
(58) Field of Search ................................. 382/305–307, 382/209, 278, 217–219, 311, 313; 707/101, 102, 3, 6, 204; 348/174, 175, 231.99, 231.6, 238, 239, 231.3, 231.2; 358/403

(56) References Cited

U.S. PATENT DOCUMENTS

| | | | |
|---|---|---|---|
| 4,573,084 A | * | 2/1986 | Iida .............................. 358/300 |
| 4,768,099 A | | 8/1988 | Mukai |
| 5,103,318 A | | 4/1992 | Takaoka |
| 5,172,245 A | * | 12/1992 | Kita et al. ................... 358/403 |
| 5,226,145 A | * | 7/1993 | Moronaga et al. ........... 395/425 |
| 5,335,072 A | * | 8/1994 | Tanaka et al. ............... 358/909 |
| 5,576,759 A | | 11/1996 | Kawamura et al. |
| 5,689,303 A | * | 11/1997 | Kuroiwa ................... 348/231.3 |
| 5,710,843 A | * | 1/1998 | Tsukamoto et al. .......... 382/305 |
| 5,787,414 A | * | 7/1998 | Miile et al. ..................... 707/2 |
| 5,805,746 A | * | 9/1998 | Miyatake et al. ............ 382/305 |
| 5,806,072 A | * | 9/1998 | Kuba et al. .................. 707/200 |
| 5,956,083 A | * | 9/1999 | Taylor et al. ............. 348/231.8 |
| 5,991,466 A | * | 11/1999 | Ushiro et al. ................ 382/305 |
| 6,111,605 A | * | 8/2000 | Suzuki ........................ 348/220 |
| 6,201,571 B1 | * | 3/2001 | Ota ............................. 348/239 |
| 6,226,449 B1 | | 5/2001 | Inoue et al. |

FOREIGN PATENT DOCUMENTS

| | | |
|---|---|---|
| EP | 0678816 A2 | 10/1995 |
| EP | 0802688 A2 | 10/1997 |
| EP | 0959418 A2 | 11/1999 |
| JP | 1-278170 | 11/1989 |
| JP | 8-140027 A | 5/1996 |
| WO | WO97/18440 | 5/1997 |

* cited by examiner

Primary Examiner—Bhavesh M. Mehta
Assistant Examiner—Yosef Kassa
(74) Attorney, Agent, or Firm—Burns, Doane, Swecker & Mathis, L.L.P.

(57) ABSTRACT

An image retrieval system for retrieving a plurality of images recorded in a recording medium, records data concerning operations and processing for image files as history data. A desired image is found based on the history data. Further, an image is found based on a combination of photographing condition in a photographing operation, and the history data of the operations executed for the image file. Therefore, the image retrieval system allows the image to be efficiently, exactly, and conveniently found without a trouble of assigning key information to the image file.

27 Claims, 23 Drawing Sheets

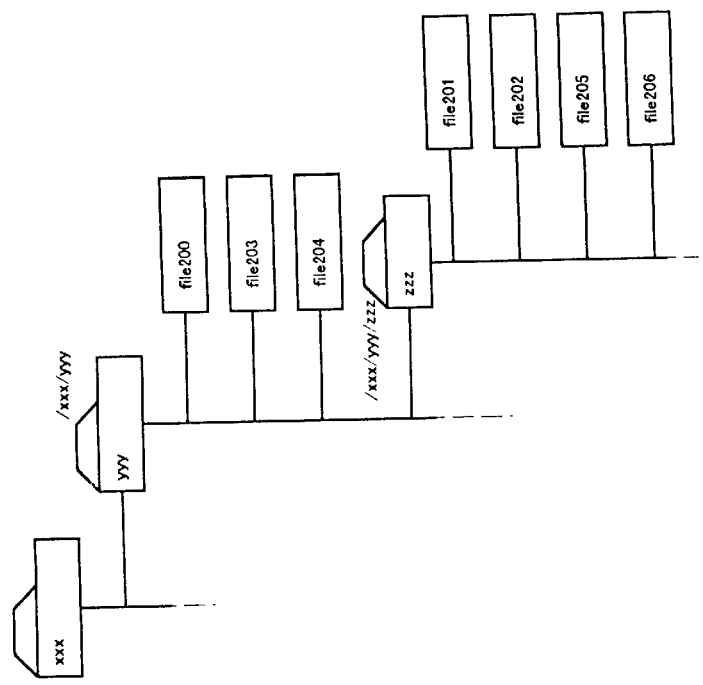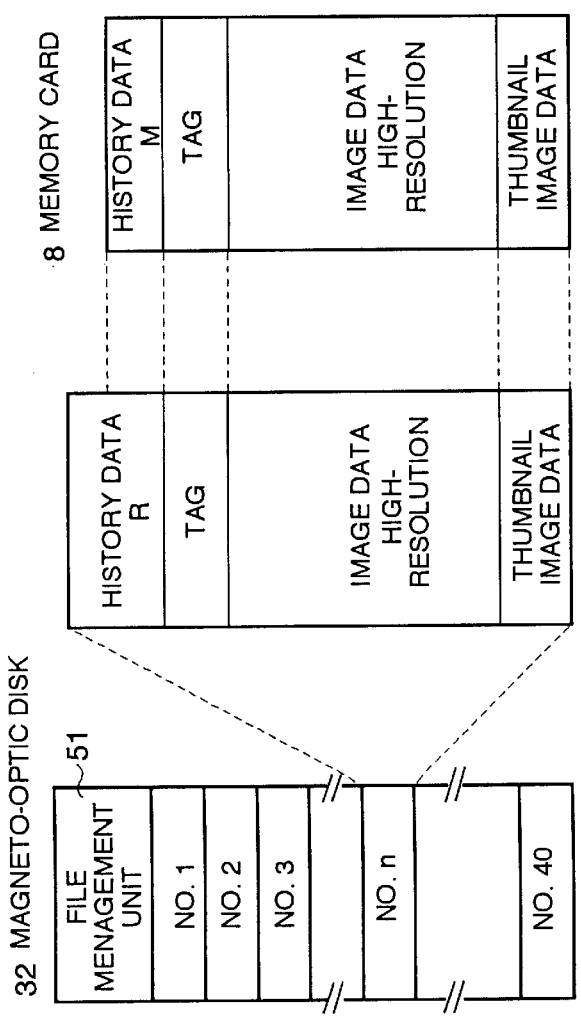
FIG. 11(a)
FIG. 11(b)

FIG. 15

HISTORY TABLE

COLUMN

| 1st | 2nd | 3rd | 4th | 5th | 6th | 7th | 8th | 9th | 10th |
|---|---|---|---|---|---|---|---|---|---|
| TAG INFORMATION | | | | | HISTORY DATA R / HIST. DATA M | | | | |
| FRAME | PHOTO | | CAMERA ID | | TIME | DISK ID | | | |
| No | Date | Time | ID | Flash | Cview | histMD | Rank | histMDDate | hist Pickup |
| ...... | ...... | ...... | ...... | ...... | ...... | ...... | ...... | ...... | ...... |
| 100 | 1997/9/10 | 15:30:21 | 01234567 | 1 | 0 | 14 | 1 | 1997/9/30 | 0 |
| 101 | 1997/9/10 | 15:35:12 | 01234567 | 1 | 0 | 14 | 1 | 1997/9/30 | 0 |
| 102 | 1997/9/10 | 15:56:26 | 01234567 | 0 | 0 | 14 | 1 | 1997/9/30 | 0 |
| 103 | 1997/9/10 | 16:10:52 | 01234567 | 0 | 0 | 14 | 1 | 1997/9/30 | 0 |
| 104 | 1997/9/10 | 17:21:07 | 01234567 | 0 | 10 | 14 | 4 | 1997/9/30 | 1 |
| 105 | 1997/9/10 | 17:22:42 | 01234567 | 0 | 1 | 14 | 2 | 1997/9/30 | 1 |
| 106 | 1997/9/10 | 17:25:56 | 01234567 | 0 | 1 | 14 | 1 | 1997/9/30 | 1 |
| 107 | 1997/9/10 | 17:30:41 | 01234567 | 0 | 0 | 14 | 7 | 1997/9/30 | 1 |
| 108 | 1997/9/10 | 17:56:11 | 01234567 | 0 | 0 | 14 | 1 | 1997/9/30 | 1 |
| 109 | 1997/9/15 | 08:25:45 | 01234567 | 0 | 0 | 14 | 1 | 1997/9/30 | 1 |
| 110 | 1997/9/15 | 10:12:53 | 01234567 | 0 | 1 | 14 | 1 | 1997/9/30 | 1 |
| 111 | 1997/9/15 | 10:13:32 | 01234567 | 0 | 5 | 14 | 2 | 1997/9/30 | 1 |
| 112 | 1997/9/15 | 10:18:23 | 01234567 | 0 | 1 | 14 | 3 | 1997/9/30 | 2 |
| 113 | 1997/9/15 | 11:52:56 | 01234567 | 0 | 7 | 14 | 3 | 1997/9/30 | 1 |
| 114 | 1997/9/15 | 11:59:18 | 01234567 | 0 | 1 | 14 | 0 | 1997/9/30 | 0 |
| 115 | 1997/9/15 | 12:10:02 | 01234567 | 0 | 8 | 14 | 3 | 1997/9/30 | 0 |
| 116 | 1997/9/15 | 12:12:45 | 01234567 | 0 | 8 | 14 | 4 | 1997/9/30 | 1 |
| 117 | 1997/9/15 | 12:18:08 | 01234567 | 0 | 1 | 14 | 1 | 1997/9/30 | 1 |
| 118 | 1997/9/15 | 12:21:47 | 01234567 | 0 | 0 | 14 | 1 | 1997/9/30 | 1 |
| 119 | 1997/9/15 | 13:04:34 | 01234567 | 1 | 0 | 14 | 1 | 1997/9/30 | 1 |
| 120 | 1997/9/17 | 13:07:25 | 01234567 | 0 | 0 | 14 | 2 | 1997/9/30 | 1 |
| 121 | 1997/9/17 | 13:08:55 | 01234567 | 0 | 0 | 14 | 0 | 1997/9/30 | 0 |
| 122 | 1997/9/17 | 13:12:52 | 01234567 | 0 | 0 | 14 | 0 | 1997/9/30 | 0 |
| 123 | 1997/9/17 | 13:14:52 | 01234567 | 0 | 0 | 14 | 0 | 1997/9/30 | 0 |
| 124 | 1997/9/17 | 13:24:32 | 01234567 | 0 | 0 | 14 | 0 | 1997/9/30 | 0 |
| 125 | 1997/9/17 | 13:30:21 | 01234567 | 1 | 1 | 14 | 0 | 1997/9/30 | 0 |
| 126 | 1997/9/17 | 13:33:52 | 01234567 | 0 | 1 | 14 | 0 | 1997/9/30 | 0 |
| 127 | 1997/9/17 | 13:45:45 | 01234567 | 0 | 0 | 14 | 0 | 1997/9/30 | 0 |
| 128 | 1997/9/17 | 13:50:19 | 01234567 | 0 | 1 | 14 | 0 | 1997/9/30 | 0 |
| 129 | 1997/9/17 | 14:02:03 | 01234567 | 1 | 1 | 14 | 0 | 1997/9/30 | 0 |
| 130 | 1997/9/20 | 14:03:55 | 01234567 | 0 | 0 | 14 | 0 | 1997/9/30 | 0 |
| 131 | 1997/9/20 | 14:21:22 | 01234567 | 0 | 0 | 14 | 0 | 1997/9/30 | 0 |
| 132 | 1997/9/20 | 14:30:14 | 01234567 | 0 | 0 | 14 | 0 | 1997/9/30 | 0 |
| 133 | 1997/9/20 | 14:35:42 | 01234567 | 1 | 0 | 14 | 0 | 1997/9/30 | 0 |
| 134 | 1997/9/20 | 14:38:18 | 01234567 | 0 | 0 | 14 | 0 | 1997/9/30 | 0 |
| 135 | 1997/9/20 | 14:50:41 | 01234567 | 0 | 0 | 14 | 0 | 1997/9/30 | 0 |
| 136 | 1997/9/24 | 14:52:26 | 01234567 | 0 | 0 | 14 | 0 | 1997/9/30 | 0 |
| 137 | 1997/9/24 | 14:56:44 | 01234567 | 0 | 0 | 14 | 0 | 1997/9/30 | 0 |
| 138 | 1997/9/24 | 14:59:53 | 01234567 | 0 | 0 | 14 | 0 | 1997/9/30 | 0 |
| 139 | 1997/9/24 | 15:23:11 | 01234567 | 0 | 0 | 14 | 1 | 1997/9/30 | 1 |
| ...... | ...... | ...... | ...... | ...... | ...... | ...... | ...... | ...... | ...... |

FIG. 16

| COLUMN | | | | | | | |
|---|---|---|---|---|---|---|---|
| 11th | 12th | 13th | 14th | 15th | 16th | 17th | 18th |
| (SEC.) histViewtime | histPickupDate | histPrint | histPrintDate | histPCDate | histEdit | histEditCont | histScroDate |
| 1 | 1997/9/30 | 1 | 1997/10/1 | 0 | 0 | 0 | 0 |
| 1 | 1997/9/30 | 1 | 1997/10/1 | 0 | 0 | 0 | 0 |
| 1 | 1997/9/30 | 1 | 1997/10/1 | 0 | 0 | 0 | 0 |
| 1 | 1997/9/30 | 1 | 1997/10/1 | 0 | 0 | 0 | 0 |
| 2 | 1997/9/30 | 2 | 1997/10/10 | 0 | 1 | 2 | 1997/10/10 |
| 2 | 1997/9/30 | 1 | 1997/10/1 | 0 | 0 | 0 | 0 |
| 2 | 1997/9/30 | 0 | 0 | 0 | 0 | 0 | 0 |
| 23 | 1997/9/30 | 0 | 0 | 0 | 0 | 0 | 0 |
| 1 | 1997/9/30 | 0 | 0 | 0 | 0 | 0 | 0 |
| 1 | 1997/9/30 | 0 | 0 | 0 | 0 | 0 | 0 |
| 1 | 1997/9/30 | 0 | 0 | 0 | 0 | 0 | 0 |
| 1 | 1997/9/30 | 1 | 1997/10/1 | 0 | 0 | 0 | 0 |
| 5 | 1997/10/1 | 0 | 0 | 0 | 0 | 0 | 0 |
| 6 | 1997/9/30 | 1 | 1997/10/1 | 0 | 0 | 0 | 0 |
| 1 | 1997/9/30 | 0 | 0 | 0 | 0 | 0 | 0 |
| 1 | 1997/9/30 | 1 | 1997/10/1 | 0 | 0 | 0 | 0 |
| 8 | 1997/9/30 | 1 | 1997/10/1 | 0 | 2 | 3 | 1997/10/10 |
| 1 | 1997/9/30 | 0 | 0 | 0 | 0 | 0 | 0 |
| 1 | 1997/9/30 | 0 | 0 | 0 | 0 | 0 | 0 |
| 1 | 1997/9/30 | 0 | 0 | 0 | 0 | 0 | 0 |
| 4 | 1997/9/30 | 0 | 0 | 0 | 0 | 0 | 0 |
| 1 | 1997/9/30 | 0 | 0 | 0 | 0 | 0 | 0 |
| 1 | 1997/9/30 | 0 | 0 | 0 | 0 | 0 | 0 |
| 1 | 1997/9/30 | 0 | 0 | 1997/9/30 | 0 | 0 | 0 |
| 1 | 1997/9/30 | 0 | 0 | 1997/9/30 | 0 | 0 | 0 |
| 1 | 1997/9/30 | 0 | 0 | 1997/9/30 | 0 | 0 | 0 |
| 1 | 1997/9/30 | 0 | 0 | 0 | 0 | 0 | 0 |
| 1 | 1997/9/30 | 0 | 0 | 0 | 0 | 0 | 0 |
| 1 | 1997/9/30 | 0 | 0 | 1997/9/30 | 0 | 0 | 0 |
| 1 | 1997/9/30 | 0 | 0 | 0 | 0 | 0 | 0 |
| 1 | 1997/9/30 | 0 | 0 | 0 | 0 | 0 | 0 |
| 1 | 1997/9/30 | 0 | 0 | 0 | 0 | 0 | 0 |
| 1 | 1997/9/30 | 0 | 0 | 1997/9/30 | 0 | 0 | 0 |
| 1 | 1997/9/30 | 0 | 0 | 0 | 0 | 0 | 0 |
| 1 | 1997/9/30 | 0 | 0 | 0 | 0 | 0 | 0 |
| 1 | 1997/9/30 | 0 | 0 | 0 | 0 | 0 | 0 |
| 1 | 1997/9/30 | 0 | 0 | 1997/9/30 | 0 | 0 | 0 |
| 1 | 1997/9/30 | 0 | 0 | 0 | 0 | 0 | 0 |
| 1 | 1997/9/30 | 0 | 0 | 0 | 0 | 0 | 0 |

IMAGE RETRIEVAL SYSTEM FOR RETRIEVING A PLURALITY OF IMAGES WHICH ARE RECORDED IN A RECORDING MEDIUM, AND A METHOD THEREOF

This application is based on Patent Applications Nos.10-036464, 10-03-6465 and 10-036466 filed in Japan, the contents of which are hereby incorporated by reference.

This invention relates to an image retrieval system which is applied to an image photographing apparatus such as a digital camera, and especially relates to an art for retrieving and looking through images. Further, the invention relates to a device for displaying plural image files which are recorded into an image recording medium by the image photographing apparatus such as the digital camera, and also relates to a method thereof.

BACKGROUND OF THE INVENTION

Hitherto, there has been known an image database in which data of images photographed by the apparatus such as a digital camera are recorded in an image-recording medium, and a retrieval system thereof. The image database of this kind, which relates key information (code information) to image data of image files, is generally aimed at finding a target image by inputting key information in a retrieval operation performed by a retrieval system. On the other hand, there has also been known a system having a function for retrieving and looking through (named as "browsing") the target image by sequentially displaying the images recorded in the image database onto the display device. The system of this kind is aimed at finding the target image owing to a visual judgment of an operator by displaying the images at every frame in addition to the retrieval based on key information.

In the above-mentioned former system, it is impossible to find the target object through the retrieval operation without operations of constructing and inputting key information. However, these operations require considerable effort. Especially, as to the image data in the digital camera, it needs to input key information in a photographing operation (because these may be forgotten unless inputted immediately), but this operation is generally troublesome, and besides users may let the shutter chance slip away while inputting the key information.

In the above-mentioned latter system, the system practically and exactly finds the target image in the browsing operation for several dozens of image data. However, as to increased numbers of images, the system takes great time to browse, which is inefficient and unpractical. Especially in the digital camera which eliminates the need for processing of developing, printing, and enlarging, users usually take greater numbers of photographs compared in the case of a camera using a film, so that number of image data tends to increase. As mentioned above, in order to exactly retrieve an image with eliminating the trouble of assigning the key information, there is demanded a method of browsing the images thereby finding the desired image. However, several times of browsing operation for the great amount of data take much expense in time and effort.

SUMMARY OF THE INVENTION

The present invention is made to dissolve the problems as noted above. One object of the present invention is to provide an image retrieval system which allows an image to be found based on history data concerning an operation for image files recorded in an image recording medium by an apparatus such as a digital camera, thereby making it possible to efficiently and accurately find the desired image without a trouble of assigning key information for an image file.

Another object of the present invention is to provide an image retrieval system which allows an image to be found based on a combination of photographic condition in a photographing operation and history data concerning an operation for image file, thereby allowing an efficient and accurate image retrieval.

A further object of the present invention is to provide a device for displaying images wherein, in view of a high probability that an image accessed even once after photographed is also accessed hereafter, the device records each operation for each image as history data, and finds a desired image based on the history data for the image, thereby realizing an easy and convenient image retrieval.

In order to attain the above object, according to one aspect of the present invention, an image retrieval system which retrieves a plurality of images recorded in a recording medium, comprises: an indicator which commands a processing to be executed for the image; a setter which sets up history data for retrieving said image in accordance with the processing commanded by the indicator; and, a retrieval device which retrieves the image based on said history data.

According to another aspect of the present invention, a method for retrieving an image which is recorded in a recording medium, comprises following steps: a step for commanding a processing to be executed for the image; a step for setting history data to retrieve said image in accordance with the processing command; and, a step for retrieving the image based on said history data.

According to further aspect of the present invention, an image photographing apparatus comprises: an image sensor; a recording medium which records images photographed by the image sensor; a reproducer which reproduces images recorded in the recording medium; a timer which counts a time for displaying the image; and, a recorder which records data based on said time for displaying the image, into the recording medium so as to make a correspondence between the data and the image.

BRIEF DESCRIPTION OF THE DRAWINGS

FIGS. 11(a) and 11(b) are views respectively showing a data arrangement and a memory structure in a magneto-optic disk and a memory card.

FIG. 15 is a view showing a history data table.

FIG. 16 is a view showing a history data table.

DETAILED DESCRIPTION OF THE PREFERRED EMBODIMENT OF THE PRESENT INVENTION

Explanation of a Digital Camera

Some embodiments of the present invention will hereinafter be described with reference to the drawings.

Figure 1:
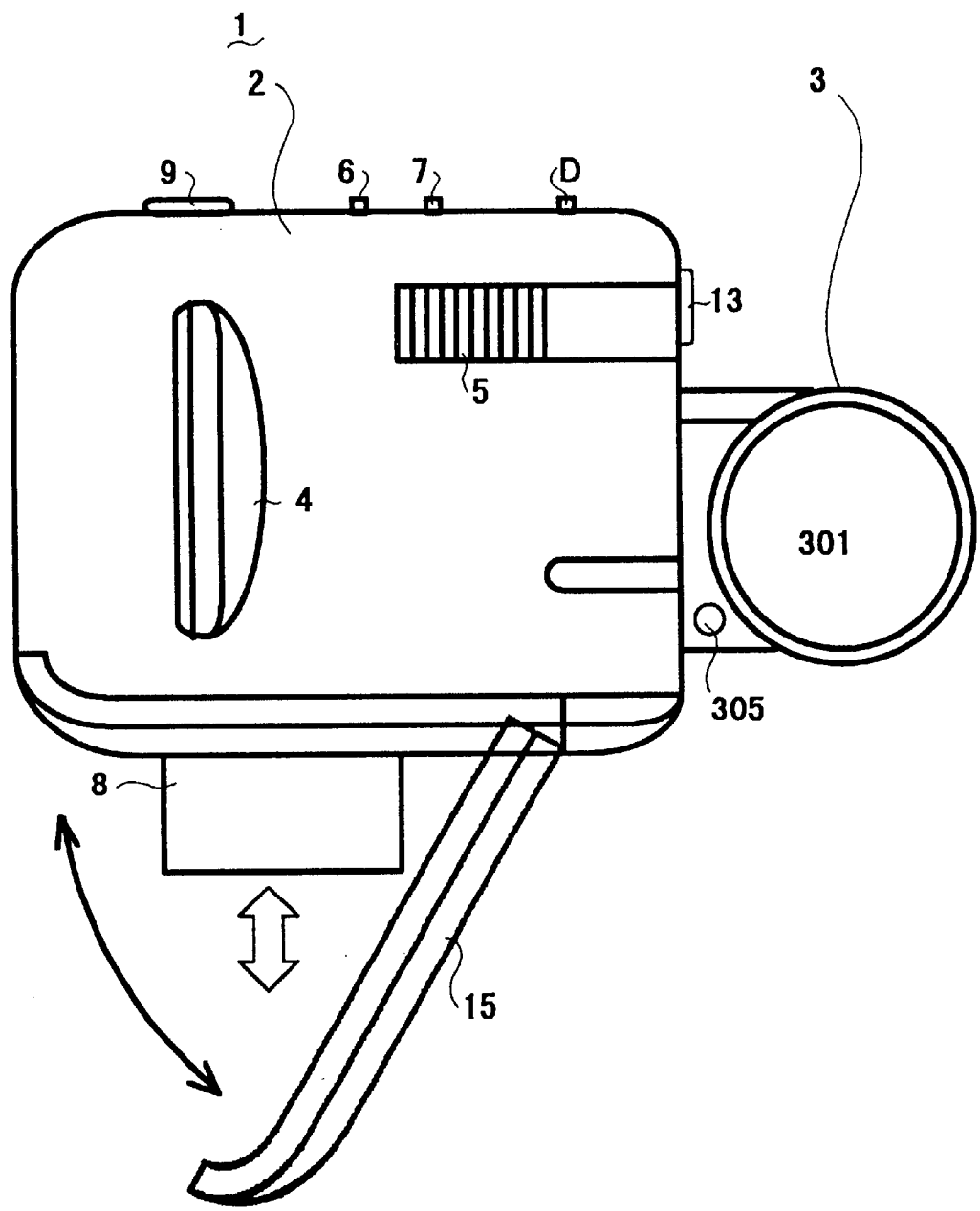
FIG. 1 is a front view of a digital camera which is applied to an image retrieval system according to one embodiment of the present invention.
Figure 2:
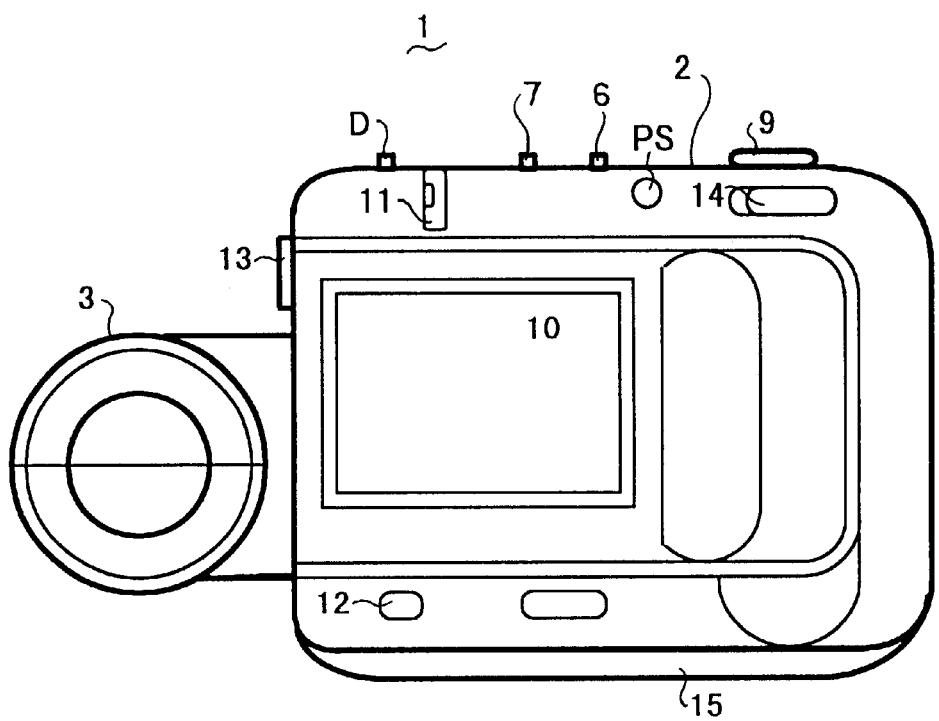
FIG. 2 is a rear elevation view of the digital camera.
Figure 3:
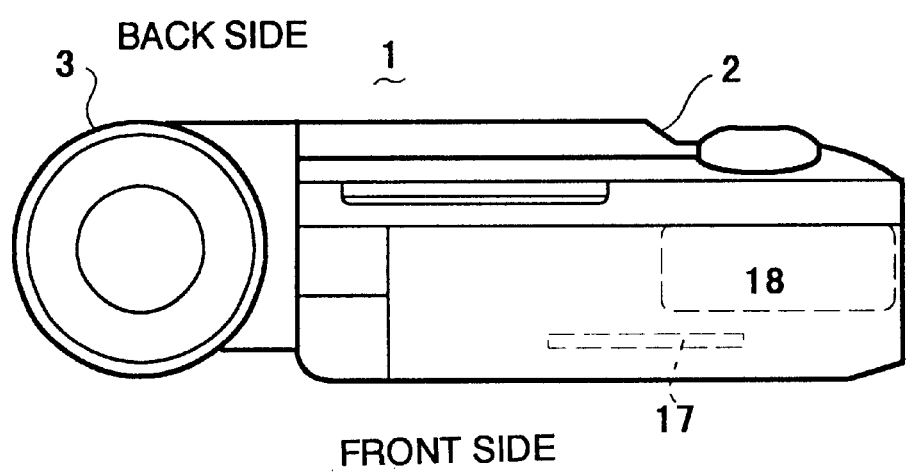
FIG. 3 is a bottom view of the digital camera.
Figure 4:
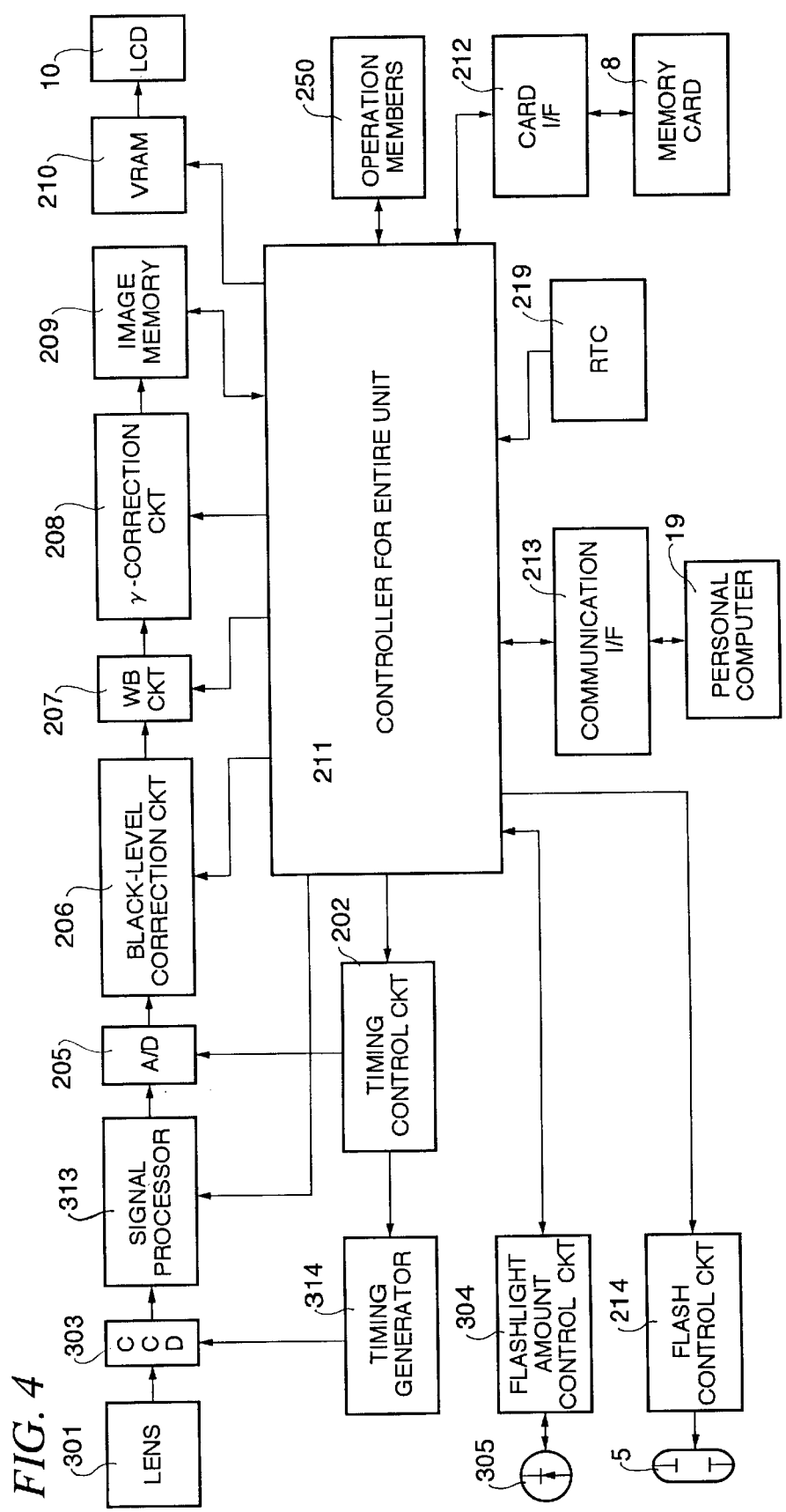
FIG. 4 is a block diagram showing an electrical structure of the digital camera.
Figure 5:
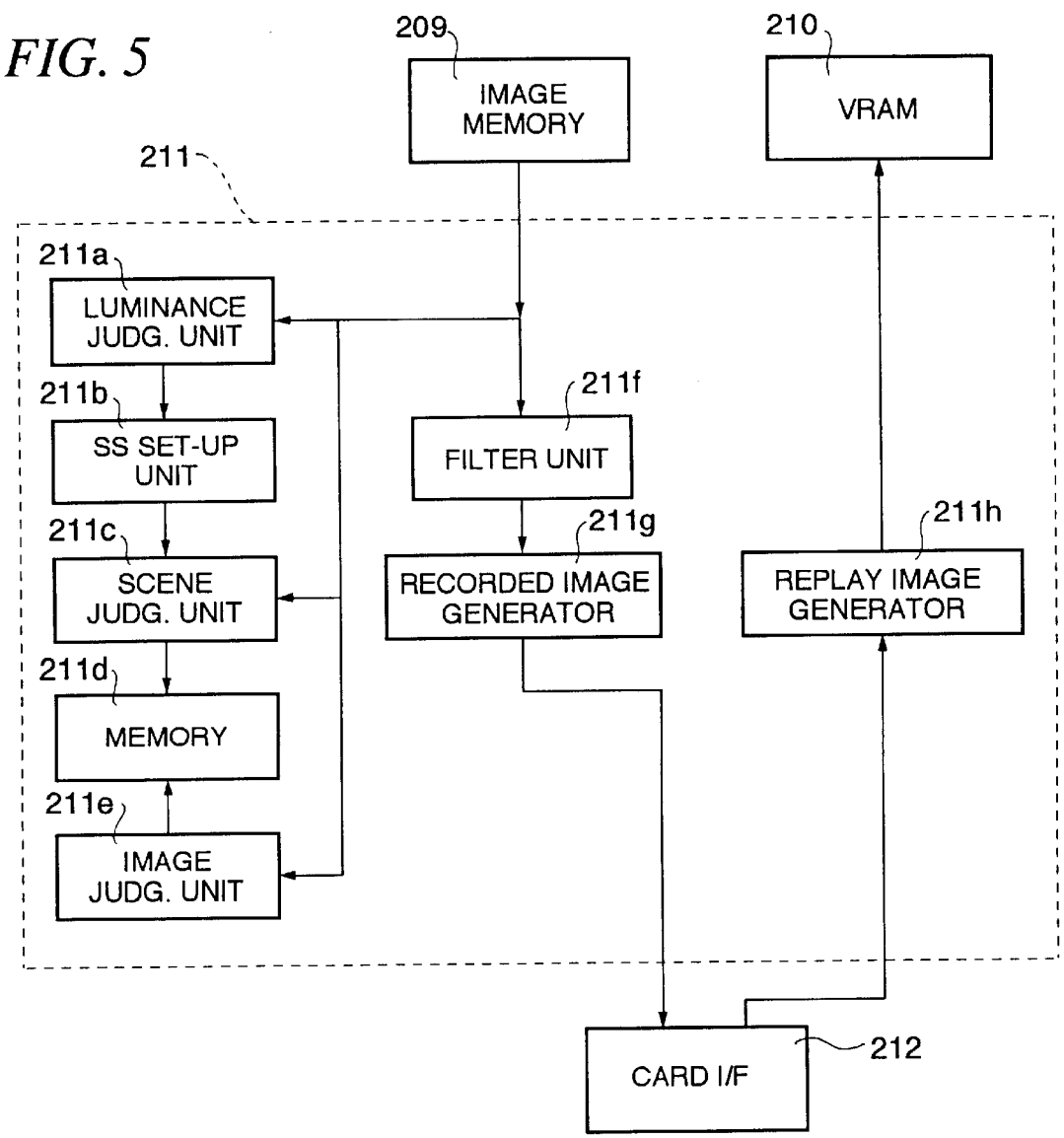
FIG. 5 is a block diagram showing a detailed structure of an entire controller which is equipped in the digital camera.

FIGS. 1 to 3 are respectively a front view, a rear view, and a bottom view of a digital camera 1 which is applied to an image retrieval system according to one embodiment of the present invention. FIG. 4 is a block diagram showing an electrical structure of the digital camera 1, and FIG. 5 is a block diagram showing a detailed structure of a controller 211 which is equipped in the digital camera 1. Referring to these figures, the digital camera 1 comprises a box-shaped camera body unit 2 and an image pickup unit 3 shaped like a rectangular form. The image pickup unit 3 is removably mounted on a right side of the camera body unit 2 when viewed from the front. Besides, the image pickup unit 3 is structured so as to rotate in a plane parallel to the right side of the camera body unit 2.

The image pickup unit 3 comprises an image pickup device which includes a macro-zoom photographic lens and a photoelectric conversion device such as a CCD (charge coupled device). The image pickup unit 3 captures an object image which is composed of electrical charge signals. Said electrical charge signals are generated by photoelectrically converting an optical image of the object with pixels of the CCD. The camera body unit 2 comprises a display unit 10, a card slot 17, and a connecting terminal 13. The display unit. 10 contains a LCD (liquid crystal display). The card slot 17 makes an insertion for a memory card 8 in which image data is stored. The connecting terminal 13 makes an external connection with a personal computer. The camera body unit 2 performs predeterminled processing for the image signal which is captured mainly by the image pickup unit 3, and then, performs processing such as the image display into the display unit 10, the image data recording into the memory card 8, and the image data transfer into the personal computer.

The image pickup unit 3 contains a macro-zoom lens 301, and has an image pickup circuit with a CCD color area sensor 303. Said image pickup circuit is provided behind the macro-zoom lens 301. Further, the image pickup unit 3 comprises a flashlight amount control sensor 305 which receives a right reflected from an object receiving a flashlight. The flashlight amount control sensor 305 is electrically connected with a flashlight amount control circuit 304 which is provided in the image pickup unit 3.

As shown in FIG. 1 showing the front side of the camera body unit 2, the camera body unit 2 is furnished with a grip member 4 in a left end part thereof, and with a built-in flash 5 in an upper-right end thereof. Also in FIGS. 2 and 3, the camera body unit 2 is provided in its upper middle side with switches 6 and 7 for advancing frames in an operation for reproducing the recorded frames. The switch 6 is used (hereinafter referred to as UP switch) for advancing recorded frames in ascending order of frame numbers (photographing order). The switch 7 is used (hereinafter referred to as DOWN switch) for advancing recorded frames in descending order of frame numbers. When viewed from the back side of the camera body unit 2, the camera body unit 2 is provided in a left side of the DOWN switch 7 with a delete switch D for deleting images based on the image data recorded in the memory card 8, and also provided in a right side of the UP switch 6 with a shutter button 9.

As shown in FIGS. 2 and 3, the camera body unit 2 is provided in the middle left end of the back side thereof with a LCD (liquid crystal display) unit 10 for monitoring and displaying the photographed image (corresponding to a viewfinder) and for reproducing and displaying the recorded image. The camera body unit 2 is provided in the upper side of the LCD unit 10 with a FL (flash) mode setup switch 11 and a power switch PS. The FL mode setup switch 111 switches modes concerning the flash emission. The camera body unit 2 is provided in the lower side of the LCD unit 10 with a compression-rate setup sliding switch 12. The compression-rate setup switch 12 sets up a compression rate K of the image data to be recorded in the memory card 8. Also, there is provided a connecting terminal 13 at the side of the camera body unit 2. The connecting terminal 13 makes an external connection with a personal computer.

The digital camera 1 has three kinds of flash concerning modes: "auto-flash mode", "forcible-flash mode", and "no-flash mode". In the "auto-flash mode", the built-in flash 5 automatically makes a flash in accordance with the luminance of the object to be photographed. In the "forcible-flash mode", the built-in flash 5 forcibly makes a flash regardless of the luminance of the object to be photographed. In the "no-flash mode", the built-in flash 5 is prohibited from flashing. Every press of the FL mode setup switch 11 cyclically changes the mode between the "auto-flash mode", "forcible-flash mode", and "no-flash mode", and sets up selected one of these modes. Also, in the digital camera 1, the compression rate K of two kinds (1/8 and 1/20) are selected and set up. By sliding the compression-rate setup switch 12 into the right, the compression rate K=1/8 is set up, and by sliding into the left, the compression rate K=1/20 is set up. The present embodiment shows a structure for selecting and setting up two kinds of compression rate K, but it is also possible to make a structure for selecting and setting up the compression rate of three kinds or more.

In the right upper end of the back side of the camera body unit 2, there is provided with a photo/reproduce mode setup switch 14 for switching and setting the mode between the "photographing mode" and "reproducing mode". The "photographing mode" is a mode for taking photographs. The "reproducing mode" is a mode for reproducing and displaying the photographed images based on image data which are recorded in the memory card 8, into the LCD unit 10. The setup switch 14 includes a sliding switch having two contact points. For example, by sliding the switch 14 into the right, the reproducing mode is set up, and by sliding into the left, the photographing mode is set up. In the bottom of the camera body unit 2, there 1is provided a card chamber 17 for inserting the memory card 8, and provided a battery chamber 18. A card entrance of chamber 17 and a battery entrance of the chamber 18 are closed by a lid 15 of a clamshell type. In the digital camera 1 of the present embodiment, a power source is four "AA" size batteries which are connected in series.

In FIG. 4, the CCD 303 photoelectrically converts an optical image of the object which is imaged by the macro-zoom lens 301, into image signals (consisting of signal arrays of pixel signals received in each pixel) of color elements: R(red), G(green) and B(blue), and then, outputs the converted image. A timing generator 314 generates various kinds of timing pulses in order to control driving of the CCD 303. Further, as to an exposure control in the image pickup unit 3, since the aperture is fixed, the exposure is controlled with adjusting charge accumulating time of the CCD 303 which corresponds with a shutter speed. If the proper shutter speed is not set up in the low luminance of the object to be photographed, the level of image signals which are output from the CCD 303, are adjusted in order to correct the improper exposure caused by lack of exposure. When the object luminance is low, the exposure is controlled with combining the shutter speed and gain adjustment.

Driving control signals of the CCD 303 which are output from the timing generator 314, are generated based on reference clock transmitted from a timing control circuit 202. For example, the timing generator 314 generates clock signals such as a timing signal for the integration start/end (exposure start/end) and read-out control signals (horizontal synchronizing signal, vertical synchronizing signal, transfer signal etc.), and then outputs into the CCD 303. Also, a signal processor circuit 313 performs a predetermined analog-signal processing for image signals (analog signals) which are output from the CCD 303. The signal processor circuit 313 has a CDS (correlation double sampling) circuit and an AGC (auto gain control) circuit. The processor circuit 313 decreases noise of the image signals with the CDS circuit, and adjusts the level of the image signals by adjusting the gain of AGC circuit.

The flashlight amount control circuit 304 carries out, in the flash photographing operation, a control for adjusting an amount of light from the flash 5 in the flashing-photography operation, into a predetermined light amount which is set by an entire controller 211. In the flash photographing operation, the flashlight reflected from the object is received by the flashlight amount control sensor 305 simultaneously with the exposure start. At the time that the light receiving amount reaches the predetermined light amount, a flash-stop signal is output from the flashlight amount control circuit 304 into a flash control circuit 214 through the controller 211. The flash control circuit 214 forcibly stops the flash 5 from making a flash. Thus, the amount of light from the flash 5 is adjusted into the predetermined light amount.

In the camera body unit 2, an A/D (analog to digital) converter 205 converts each of pixel signals from the processor circuit 313 into digital signals of 10 bits. The A/D converter 205 converts each of the pixel signals (analog signals) into the digital signals of 10 bits based on A/D converting clocks which are input from an A/D clock generator circuit (not shown in the figure). The timing control circuit 202 generates the reference clock, and the clocks for the timing generator 314 and A/D converter 205, in the camera body unit 2. The controller 211 controls the timing control circuit 202.

In the FIG. 4, the black level correction circuit 206 corrects black levels of the pixel signals (hereinafter referred to as pixel data) which are converted from analog to digital by the A/D converter 205, into a reference black level. A WB circuit 207 converts pixel data levels of each of color elements: R, G and B so that a white balance can also be corrected after a γ-correction. The WB circuit 207 converts the data levels of each of color elements: R, G, and B with a level converting table which is input from the controller 211. In the level converting table, a converting coefficient (inclination of characteristic) for each color element is set up at every photographed image by the controller 211. Also, in the figure, there is provided a γ-correction circuit 208 for correcting a γ-characteristic of pixel data. The γ-correction circuit 208 has γ-correction tables in which γ-characteristics are different from each other (e.g. six kinds of tables). The γ-correction circuit 208 performs γ-correction of pixel data with the predetermined γ-correction tables in accordance with each of photographing scenes and conditions.

Also there is provided with an image memory 209 for storing pixel data output from the γ-correction circuit 208. The image memory 209 has a capacity for one frame. If the CCD 303 includes pixels of N lines and M columns, the image memory 209 has a capacity of; N×M pixels, and stores each of pixel data into corresponding pixel positions. An image memory (VRAM) 210 is a buffer memory for images which are reproduced and displayed in the LCD unit 10. The image memory 210 has a capacity for image data corresponding to number of pixels in the LCD unit 10.

In a standby state for photographing, the image pickup unit 3 picks up the pixel data of the image at every 1/30 second. Then, each of circuits from the A/D converter 205 to the γ-correction circuit 208 performs the signal processing for said pixel data, and then, the image memory 209 stores the pixel data. After that, the pixel data is transferred into the VRAM 210 through the controller 211, and the image based on said pixel data is displayed in the LCD unit 10. Thus, a photographer can visually recognize the object image by the image displayed in the LCD unit 10. Further, in the reproducing mode, the controller 211 performs the signal processing for the image data read out from the memory card 8, and then, transfers the processed image data into the image memory 210, and displays it in the LCD unit 10. In the figure, a card I/F 212 is an interface for writing and reading the image data into and from the memory card 8. Also, there is provided with a communication I/F 213 which is an interface for making an external connection with the personal computer 19 for communication (e.g. the I/F 213 is based on USB standard).

The flash control circuit 214 is a circuit for controlling the light emission of the built-in flash 5. The flash control circuit 214 controls the flash 5 based on the control signals from the controller 211 as to whether emit or not, light-emission amount and light-emission timing. Concerning the light-emission amount of the flash 5, the flash control circuit 214 controls based on the flash-stop signal input from the flashlight amount control circuit 304. Also, there is provided with a RTC (real time clock) 219 which is a clock circuit for managing the date and time of photographing. The RTC is driven by another power source which is not shown in the figure. Operation members 250 includes the above-mentioned UP switch 6, DOWN switch 7, shutter button 9, FL mode setup switch 11, compression-rate setup switch 12 and photo/reproduce mode setup switch 14.

The controller 211 is made by a microcomputer. The controller 211 organically controls driving of each component in the image pickup unit 3 and camera body unit 2, thereby performing an entire control of the photographing operation in the digital camera 1. As shown in FIG. 5, the controller 211 is equipped with a luminance judgment unit 211a and a shutter speed (SS) setup unit 211b for setting up an exposure adjustment value (shutter speed (SS)). In the standby state for photographing, the luminance judgment unit 211a judges the luminance of the object with using an image which is captured at every 1/30 second by the CCD 303. That is, the luminance judgment unit 211a judges the luminance of the object with using the image data which is renewed and stored in the image memory 209. Besides, the luminance judgment unit 211a divides the memory area of the image memory 209 into nine blocks, and calculates the luminance data which represents each of the divided blocks with using pixel data of G (green) color element in each of the blocks.

The shutter speed setup unit 211b which has a shutter speed (SS) table, sets up a shutter speed (integration time of the CCD 303) on the basis of the object luminance judged by the luminance judgment unit 211a. The shutter speed (SS) is initially set up on 1/128 second at a camera start-up. In the standby state for photographing, the shutter speed setup unit 211b changes and sets up the shutter speed higher or lower in a step-by-step manner from an initial value in accordance with the object luminance which is judged by the luminance judgment unit 211a.

The controller 211 further comprises a scene judgment unit 211c for properly setting the shutter speed (SS), γ-correction, a filtering correction (later described) in accordance with the photographing scene. The scene judgment unit 211c judges the four types of photographing scene: "low-luminance scene", "medium-luminance normal scene", "medium-luminance rear light scene", and "high-luminance scene". The "low-luminance scene" is the scene which commonly needs a secondary light from the flash, that is, fill-flash photography such as an in-room photography, or a nighttime photography. The "medium-luminance normal scene" is the one in which illuminated light (including both of natural light and artificial light) to an object to be mainly photographed is front, and its brightness is proper so as to allow the photography without the secondary light. The "medium-luminance rear light scene" is the one in which, although the brightness is proper, the illuminated light is rear, which needs the flash emitting. The "high-luminance scene" is the one that is considerably bright such as a sea or a skiing ground in a blue sky.

Further, the controller 211 is equipped with an image judgment unit 211e. The image judgment unit 211e judges that the pickup image is an image of a usual photographed picture such as a landscape or a person (hereinafter, the image of this kind is referred to as a natural image), or that the pickup image is an image of letters or tables written on a board (hereinafter, the image of this kind similar to a binarized image is referred to as a letter image). First of all, the image judgment unit 211e makes a histogram of the luminance data in each of pixel positions, based on the pixel data which compose the pickup image stored in the image memory 209, and then, judges the contents of the pickup image based on the histogram. Generally, as to the histogram of the luminance data about the pickup image, if the image is the natural image, the histogram has only one peak value, and has less deviation in the luminance distribution. On the other hand, if the image is the letter image such as letters drawn on a white board, the histogram has each of distribution on a white part and a black part, so that the histogram has two peaks. Accordingly, the image judgment unit 211e judges whether the histogram of the luminance data BV about the pickup images has only one peak, or two peaks, thereby determining the natural image or the letter image. The judgment result is stored in the memory 211d.

Furthermore, the controller 211 is provided with a filter unit 211f and a recorded image generator 211g for performing a recording processing of the pickup image, and with a replay image generator 211h for generating replay images. The filter unit 211f performs a filtering processing. The recorded image generator 211g generates thumbnail images and compressed images. The replay image generator 211h reproduces images based on the image data recorded in the memory card 8 onto the LCD unit 10. The filter unit 211f has digital filters for correcting high frequency elements of the image data to be recorded, in order to correct image quality in regarding to outlines of the image. The filter unit 211f has five digital filters for each of the compression rates K=1/8 and 1/20: a digital filter which executes a standard outline correction; two kinds of digital filters which enhance the outlines for the standard outline correction; and two kinds of digital filters which weaken the outlines.

The recorded image generator 211g reads out pixel data from the image memory 209, and generates thumbnail images and compressed images which are to be recorded in the memory card 8. Scanning the pixel data from the image memory 209 into a raster-scanning direction, the recorded image generator 211g reads out the pixel data at every eighth pixel in each of the horizontal and vertical directions, and sequentially transfers it into the thumbnail image area in the memory card 8, thereby generating and recording the thumbnail image data into the memory card 8. Also, the recorded image generator 211g reads out all of the pixel data from the image memory 209, and performs a predetermined compression processing by means of JPEG (joint photographic coding experts group) format such as two-dimensional DCT conversion, and Modified Huffman (MH) coding, thereby generating the image data of the compressed image. The recorded image generator 211g records the compressed image data into the image area of the memory card 8.

Figure 6:
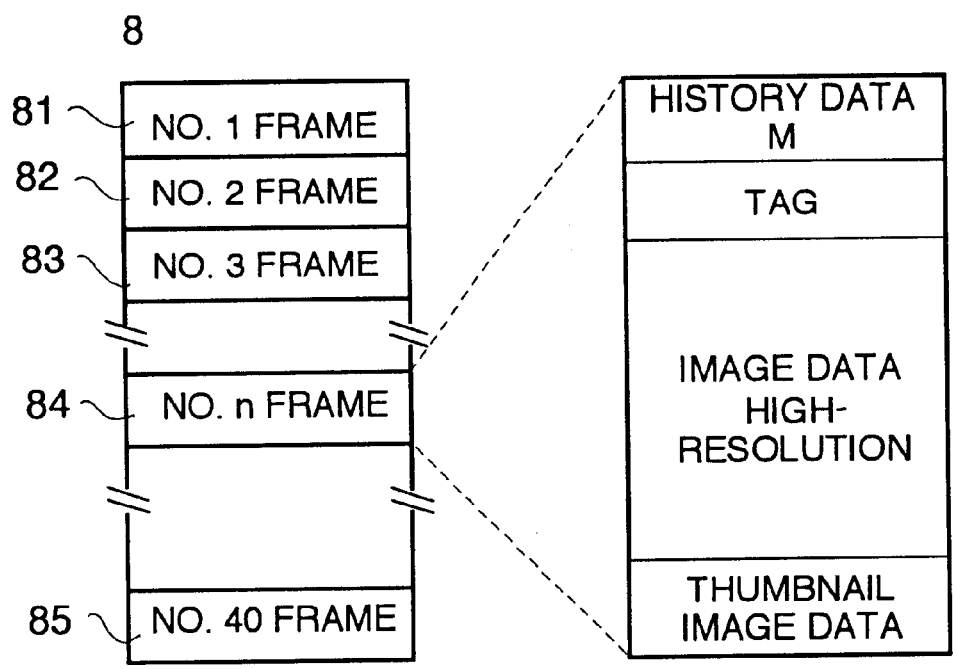
FIG. 6 is a view explaining a data arrangement in a memory card.

When a photographing operation is commanded by pressing the shutter button 9 in the photographing mode, the controller 211 generates the thumbnail image of the image which is captured in the image memory 209 after the photographing command, and generates the compressed image which is compressed in the JPEG format based on the compression rate K set up by the switch 12. Then, the controller 211 stores both of the image data into the memory card 8 together with a tag information (frame number, exposure value, shutter speed, compression rate K, photographing date, data on ON/OFF of the flash, scene data, information about judgment result of the image, etc.) about the photographed image. As to the image photographed by the digital camera 1, the memory card 8 can store forty frames of images at the compression rate of 1/20. In each of the frames, there are recorded the tag data, high-resolution image data (640×480 pixels) which is compressed in JPEG format, and the image data (80×60 pixels) for displaying thumbnail images. The image files can be managed as the image file of EXIF (exchangeable image file) format and the like at each of frames. Further, the memory card 8 includes an area for storing history data about each of images at every frame (refer to FIG. 6).

Assignment of History Data

Figure 7B:
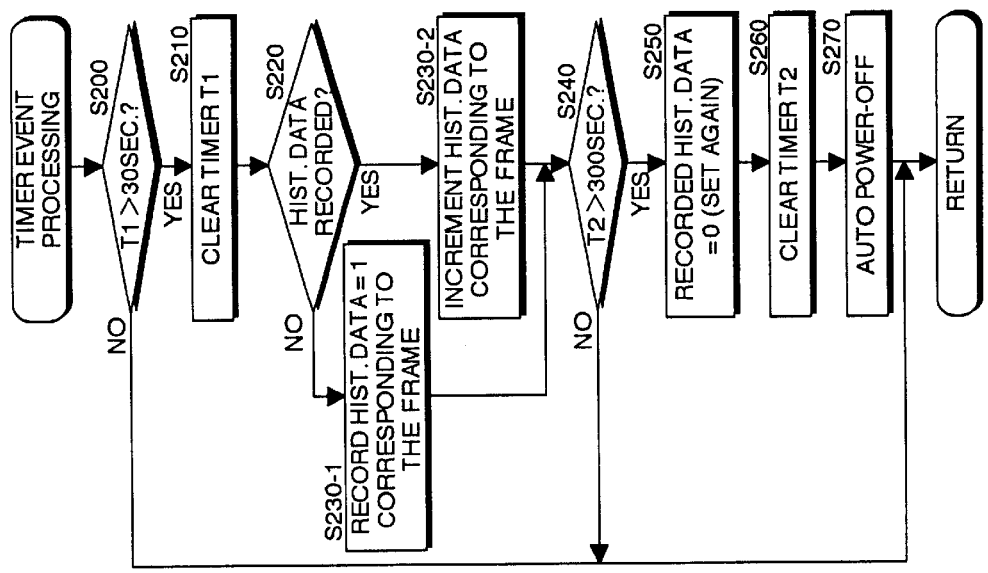
FIGS. 7(a) and 7(b) are flowcharts of a processing for writing history data into a memory.
Figure 7A:
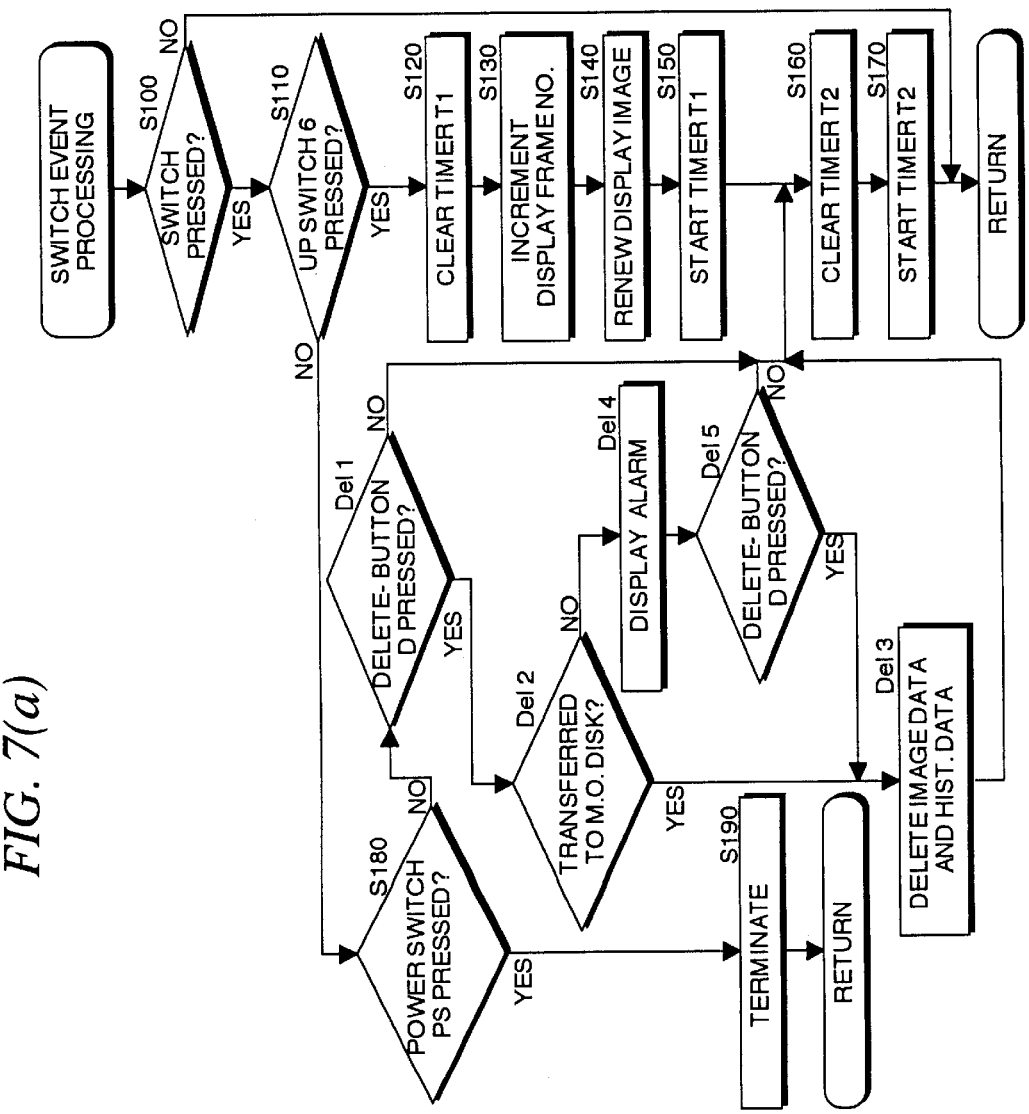

Next, referring to a flowchart shown in FIG. 7(a), a processing for writing the history data concerning the image file into the memory card 8 in the digital camera 1 will be explained. As mentioned above, by sliding the photo/reproduce mode setup switch 14 into the right, the reproduce mode is set up. In the reproduce mode, when any switch is pressed (YES in S100), and if the pressed switch is the UP switch 6 (YES in S110), a timer T1 (later described) of the display time for reproducing the image, which is currently counted, is cleared (S120). After incrementing the display frame number (S130), the process goes to a step for renewing the frame image to be displayed (S140). For example, if the UP switch 6 is pressed in a state of displaying No.3 frame, the next frame No. 4 is displayed. Then, a timer T1 for counting a display time for a renewed frame image is started (S150). The process nextly goes to a step for clearing a timer T2 which renews the value when none of switch is pressed (S160), and then, goes to a step for starting the timer T2 again (S170). The timer T2 is used for auto-power-off procedure which turns off the power when the value is a predetermined value or more.

On the other hand, if it is NO in S110, it is judged whether or not the power switch PS is pressed (S180). If the switch PS is pressed, the processing is terminated (S190). Unless the switch PS is pressed, it is judged whether the delete button D is pressed in Del 1. When the delete button D is pressed, it is judged whether the image data has been already transferred to the magneto-optic disk. If it has been already transferred, the image data and its history data are deleted (Del 3). In the case that it has not been already transferred to the disk, the procedure goes to a step for alerting the operator (Del 4). After that, if the delete button D is pressed (YES in Del 5), the image data and its history data are deleted (Del 3), and the procedure goes to the step S160. After displaying the alarm, unless the delete button S is pressed (NO in Del 5), the procedure goes to the step S160 without deleting the image data and its history data. As to the judgment whether the image data has been already transferred into the disk, as described later, it is performed based on the history data which is recorded in the memory card 8 in the transferring operation.

Next, a processing for recording history data into the memory card 8 according to the display time for reproducing the image will be explained with reference to FIG. 7(b). If the timer T1 counts up thirty seconds or more in S 200 (that is, the UP switch 6 is pressed in less than thirty seconds), it means that a specific reproduced image is kept on being displayed. The specific image is assumed to be an image which is more important than other images. Consequently, concerning such an image, the timer T1 is cleared (S210). Then, if its history data is not recorded (NO in S220), the procedure goes to a step for recording "1" for the history data concerning the display time corresponding to said image frame (S230-1). If its history data has been already recorded (YES in S220), the procedure goes to a step for incrementing the history data concerning the display time corresponding to said image frame (S230-2). Addition of 1 to the history data concerning the display time assigns higher priority to the image.

Further, in the case that the value of the timer T2 exceeds 300 seconds (YES in S240), the history data concerning the display time corresponding to the above-recorded image frame is set on "0" again (S250). This is because, even in the case that a displayed image is less important image, and if the image is kept on being displayed, the history data is assigned in S230, which may cause noises in the retrieval operation, so that the history data is deleted. After that, the timer T2 is cleared (S260), and the auto-power-off procedure is executed (S270). As shown in steps S110, S180 and S190, even if the image is displayed for a long time, when the power switch PS is pressed for turning off the power, the history data is maintained without deleted.

Transfer From the Memory Card to the Magneto-optic Disk and System Structure of the Device for Displaying Images As to image data stored in the memory card 8 which stores the images photographed by the digital camera 1, the explanation is nextly given to an operation for displaying the image onto an image display device which is a component of the image retrieval system of the present invention, or the operation for transferring the image data to another large capacity medium (magneto-optic disk).

Figure 8:
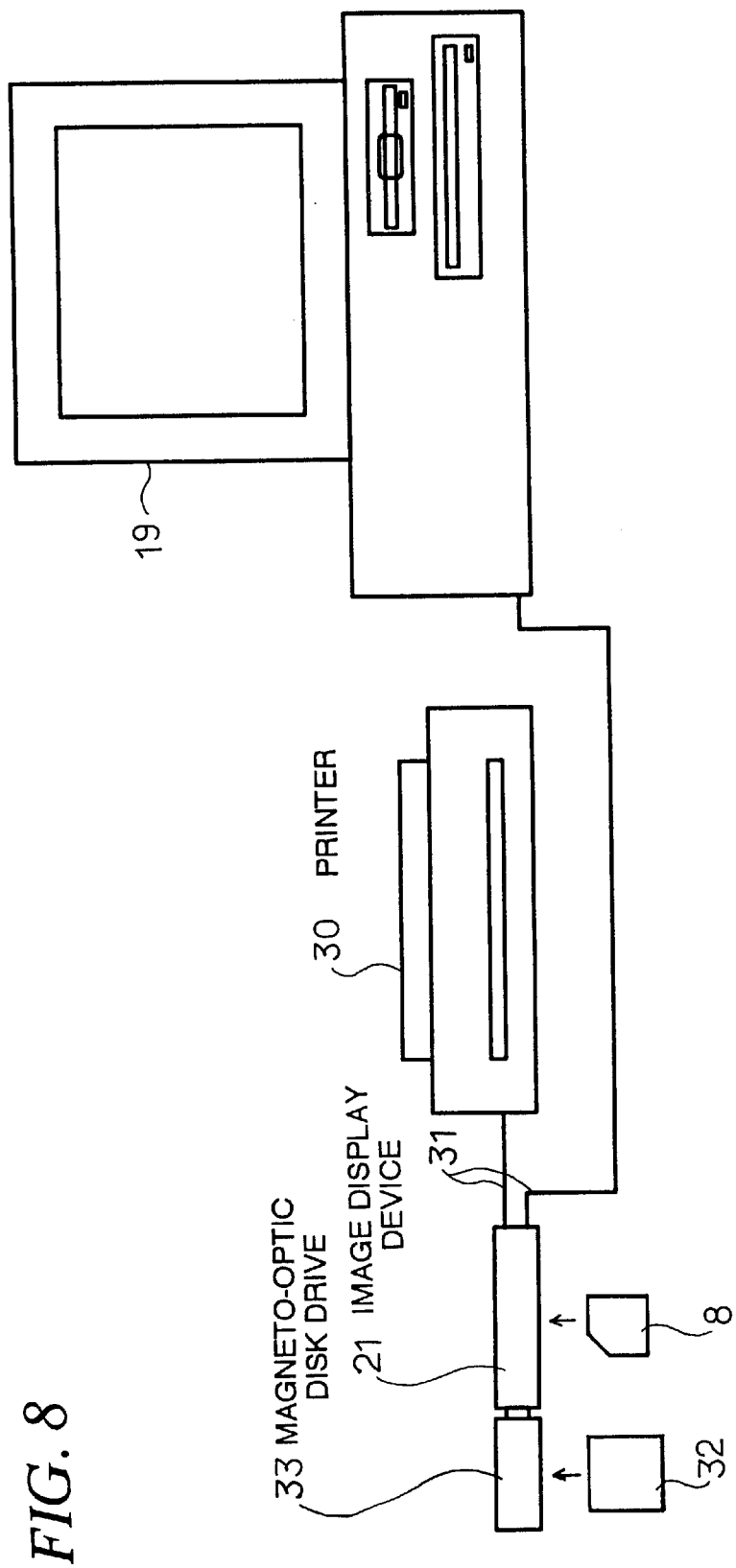
FIG. 8 is a structural view of an image retrieval system containing a device for displaying images.
Figure 9A:
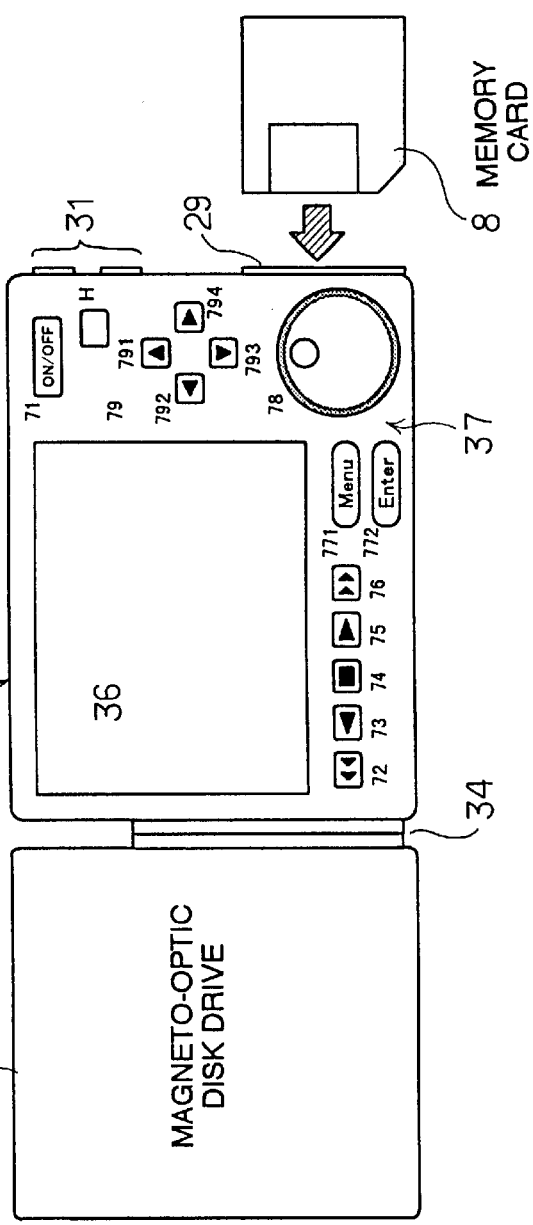
FIGS. 9(a) and 9(b) are respectively a front view of the device for displaying images and a front view of a jog shuttle.
Figure 9B:
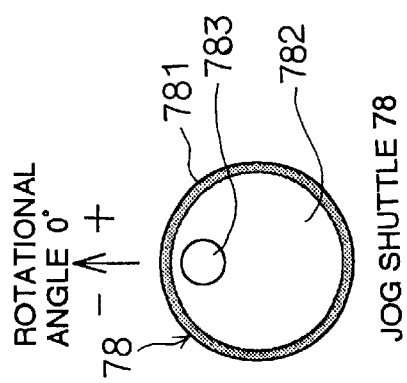
Figure 10:
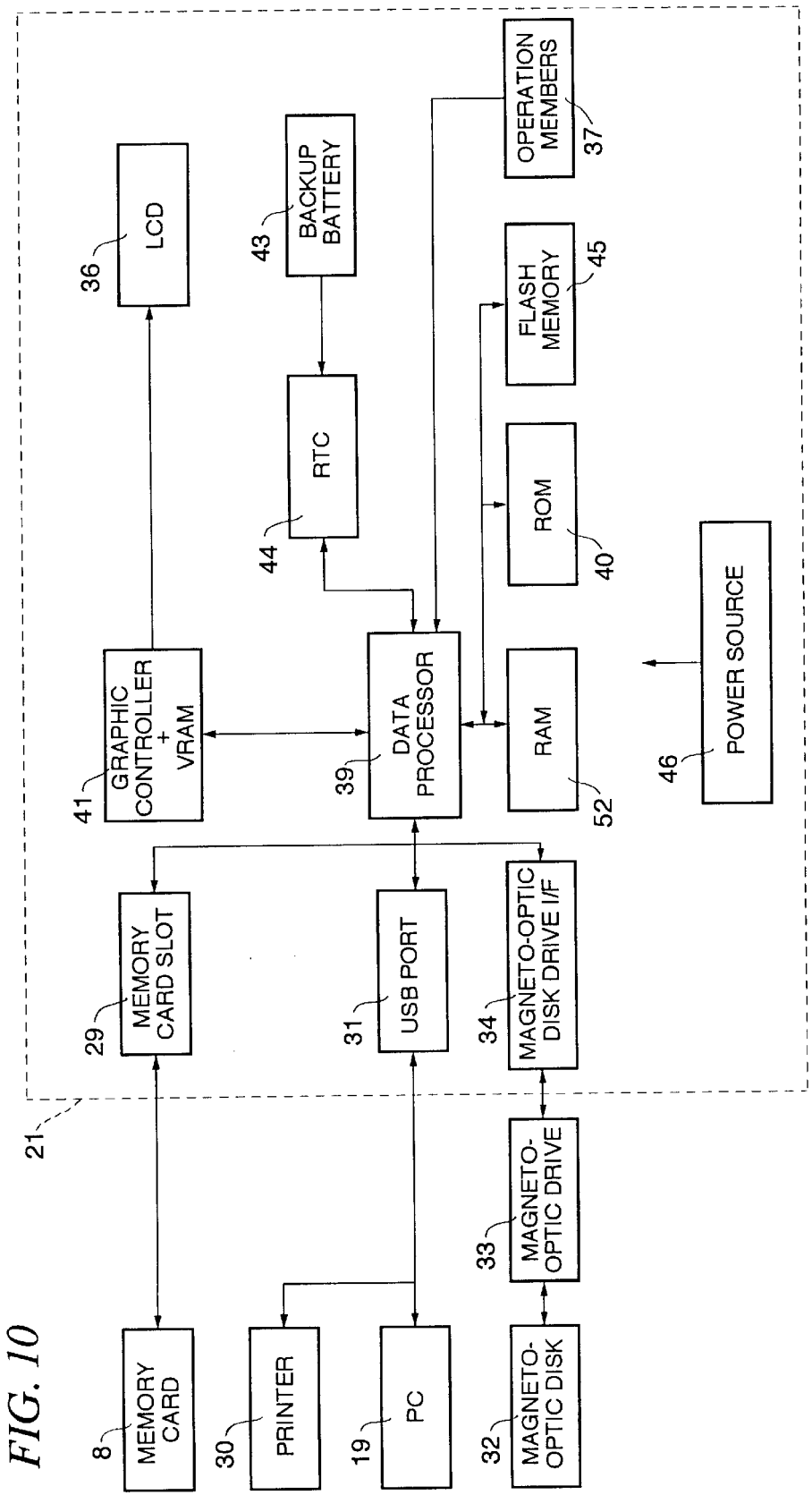
FIG. 10 is a block diagram of the device for displaying images.

Referring to FIGS. 8 to 10 showing an image display device 21, the image display device 21 comprises a memory card slot 29 for inserting the memory card 8 (image recording medium) in which images photographed by the digital camera are stored. The image display device 21 also comprises two USB (universal Serial Bus) ports 31 to which a printer 30 or a PC (personal computer) 19 is connected. Besides, the image display device 21 can make a direct connection to a magneto-optic disk drive 33 for driving a magneto-optic disk (image recording medium having large capacity) 32 via a magneto-optic disk drive interface 34. Images based on the image data recorded in the memory card 8 or the magneto-optic disk 32 are displayed on a liquid crystal display (LCD) unit 36 by the operation with switches in an operation members 37 of the image display unit 21. The display unit 36 also displays an operation menu for various operations. The operation members 37 are furnished with a history setup button H for displaying the history data about image frames onto the display unit 36.

In FIG. 10, a CPU (central processing unit) in a data processor 39 reads out programs which are stored in a ROM (read only memory), and controls the memory card slot 29, USB port 31, magneto-optic: disk interface 34, a graphic controller and VRAM 41, the LCD unit 36 and operation members 37. Thus, the entire control of the image display unit 21 is carried out. The data processor 39 makes connection to a RTC (real time clock) 44 which is driven by a backup battery 43, thereby writing date and time of data processing into the magneto-optic disk 32 and memory card 8. The image display device 21 further includes a flash memory 45 in which a result of transferring data to the magneto-optic disk is recorded. The image display device 21 obtains electricity supplied from the battery in a power source 46, besides can obtain electricity supplied by an unshown AC (alternating current) adapter. The CPU of the data processor 39 sets up the history data. The RAM 52 is used for compressing image files.

Data Arrangement in the Memory Card and Magneto-optic Disk

FIG. 11 shows a data arrangement in the memory card 8 and magneto-optic disk 32. The image data recorded by the digital camera contains 40 frames, and each of frames contains a history data "M" part, a tag (index) information part, high-resolution image data for displaying high-resolution image (640×480 pixels) which is compressed in JPEG format, and contains thumbnail image data (80×60 pixels) for displaying a contracted image or a low-resolution image. The image data can be managed as an EXIF-format image file in a unit of frames. The history data includes data such as the display time of the above-mentioned image frames. The tag information includes photographing date, a state of the flash (ON or OFF) and the like.

The magneto-optic disk 32 can record the image data transferred from the memory card 8. The recorded data are assigned numbers of thee image file such as No.1, No.2, No.3, . . . No.n, . . . , No.3000 in recorded order. As in the case of the memory card 8, each of the files records high-resolution image data, thumbnail image data, tag information and records history data R. The history data R is upwardly compatible to history data M of the memory card 8 which is assigned by the digital camera 1, since the image display device 21 has multiple functions such as an image editing operation which is not allowed in the digital camera 1. Accordingly, in the case of transferring the image data from the memory card 8 to the magneto-optic disk 32, the image display device 21 not only transfers the history data M into the memory card 8, but also secures an area for the history data to be assigned on the magneto-optic disk 32 hereafter. Thus, the file storage capacity for one frame is larger in the magneto-optic disk than in the memory card.

Also, the magneto-optic disk 32 includes a file management unit 51 for managing each of image files. The file management unit 51 contains tables for making correspondences of the whole structure of the directories or the file numbers and file names, with directories. If the directory is formed as shown in a table below, the structure is as shown in FIG. 11(b).

TABLE 1

File management table

| No. | Folder name | File name |
|---|---|---|
| 200 | /xxx/yyy | file 200 |
| 201 | /xxx/yyy/zzz | file 201 |
| 202 | /xxx/yyy/zzz | file 202 |
| 203 | /xxx/yyy | file 203 |
| 204 | /xxx/yyy | file 204 |
| 205 | /xxx/yyy/zzz | file 205 |
| 206 | /xxx/yyy/zzz | file 206 |

Jog Shuttle Manipulation

The explanation is nextly given to the case of manipulation a jog shuttle 78. As shown in FIG. 9(b), the jog shuttle wheel 781 and an inner rotational member 782. The wheel 781 rotates in the range of ±90°, and has the equal function as following keys according to the rotational angle:

State 1: +10° to +30° : forward key 75
State 2: +50° to +70° : fast-forward key 76
State 3: −10° to −30° : reverse key 73
State 4: −50° to −70° : fast-reverse key 72
State 0: Other angles Also movement from the State 1, State 2, State 3 and State 4 through the State 0 is equal to a stop button 74 being pressed.

The outer wheel 781 is urged by a spring, and is in a position of 0° unless its rotational angle is held with a finger. The inner rotationial member 782 is provided with a concavity 783 for placing the finger, and with a click-stop and a contact point in every 30° increment. When the image is displayed in a D13 screen (shown in later-described FIG. 12), and if the rotational member 782 is turned around into +direction in one unit of increment (Event+), the screen displays the image of a next following frame. Also, if the rotational member 782 is turned around into −direction in one unit of increment (Event−), the screen displays the image of an immediately preceding frame. If the forward key 75 is released immediately after being pressed, the Event+ also occurs. If the reverse key 73 is released immediately after being pressed, the Event− occurs.

Transition of Screen Views

Figure 12:
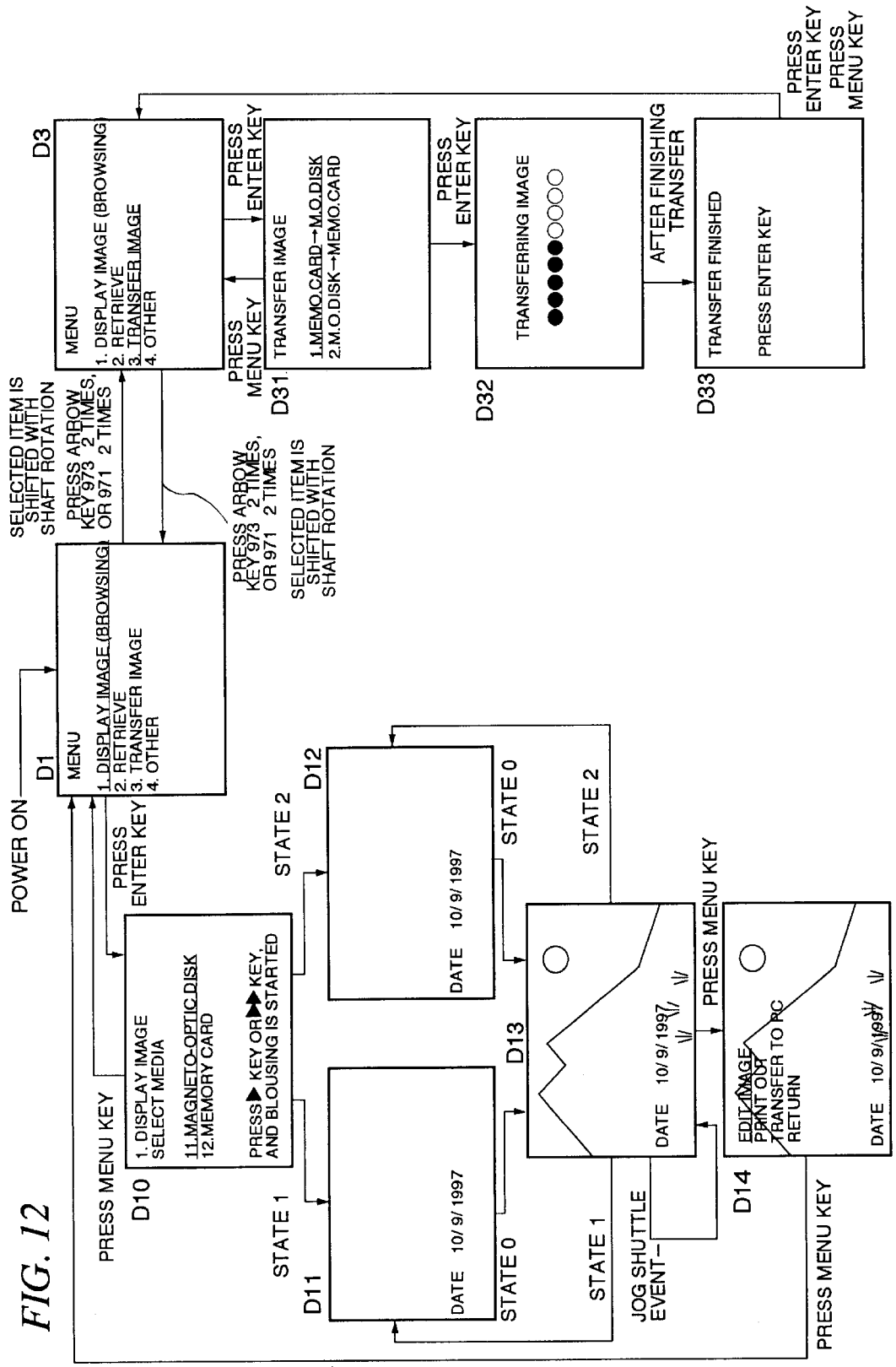
FIG. 12 is a view explaining a data transfer from the memory card, to the magneto-optic disk, and image browsing.

Referring to FIG. 12, a transition of screen views on the LCD unit 36 of the image display device 21 will be explained. By connection the magneto-optic disk drive 33 to the display device 21 and turning on a power switch 71, the program in the ROM 40 which is connected ;to the data processor 39, is read out. After an initializing process of the RAM 52 etc. following the procedure in the ROM 40, the operation members 37, memory card slot 29, USB port 31, and magneto-optic disk interface 34 are enabled. Then, the data processor 39 controls the graphic controller and VRAM 41, which displays an initial screen D1 on the LCD unit 36.

In the D1 screen in the figure, "DISPLAY IMAGE" is selected out of options. Up and down arrow keys 791 and 793 being pressed in the state of the D1 screen, the option in rotation is changed. In a state that "DISPLAY IMAGE" is selected, an enter key 772 being pressed, the screen displays a D10 screen for selecting a medium. Here, a current selection is made for either one of the magneto-optic disk 32 and memory card 8 that is connected. It is possible to make unelectable state for the other one that is not connected, or change the way of display. For instance, the other one is displayed palely. When both of the magneto-optic disk 32 and memory card 8 are connected, one of them can be selected prior to another.

When the jog shuttle is turned into the State 1 in the D10 screen, the high-resolution image of the image file recorded in the magneto-optic disk 32, is sequentially displayed at every frame in order of the photographing date (browsing mode; D11 screen). When the jog shuttle is turned into the State 0 in the browsing mode, a browsing operation is stopped, and the image displayed in the State 0 is maintained (D13 screen). On the other hand, when the jog shuttle is turned into the State 2 in the D10 screen, the thumbnail image of the image file recorded in the magneto-optic disk 32, is sequentially displayed at every frame in order of the photographing date (high-speed browsing mode; D12 screen). Since the thumbnail data amount is small (the data size is 80×60 pixels, and its display area is 640×480 pixels), the high-speed browsing is possible. The thumbnail image data can be complemented to display an expanded view for increased visibility.

If the jog shuttle is turned into the State 0 in the high-speed browsing mode in the D12 screen, the browsing is stopped, and the image which is displayed in the State 0, is maintained (D13 screen). If a menu key 771 is pressed in the D13 screen, the screen changes into a D14 screen. In the D13 screen, when the jog shuttle is once again turned into the State 1, the state becomes the browsing mode; if the jog shuttle is turned into the State 2, the state becomes the high-speed browsing mode. If the Event+ occurs in the D13 screen, the next following frame is displayed; if the Event− occurs, the immediately preceding frame is displayed. For example, in case that an operator notices that a desired image already ran past in a state of displaying No.10 frame following No.1, No.2 . . . , and No.9 frames, the operator is able to reach the desired image by turning around the inner rotational member 782 into –direction at every one unit of increment (Event–). The explanation of the screen transitions is given to the case in use of the jog shuttle, but the same is also applied to the case in use of the keys 72 to 76.

Screen Transition and File Transfer

Next, the explanation is given to a processing of the file transfer. In the D3 screen shown in FIG. 12, "3.Transfer image" being selected and the enter key being pressed, the screen changes into a D31 screen for transferring the image data. In the D31 screen, the selection is made for either the transfer from the memory card 8 to the magneto-optic disk 32, or the transfer from the magneto-optic disk 32 to the memory card 8. The transfer from the memory card 8 to the magneto-optic disk 32 being selected, and the enter key being pressed, a D32 screen is displayed for showing that the image data is being transferred. When the transfer is finished, a D33 screen is displayed for notifying it, and if the enter key is pressed, the state is returned to the D3 screen.

Image Edit

Figure 13:
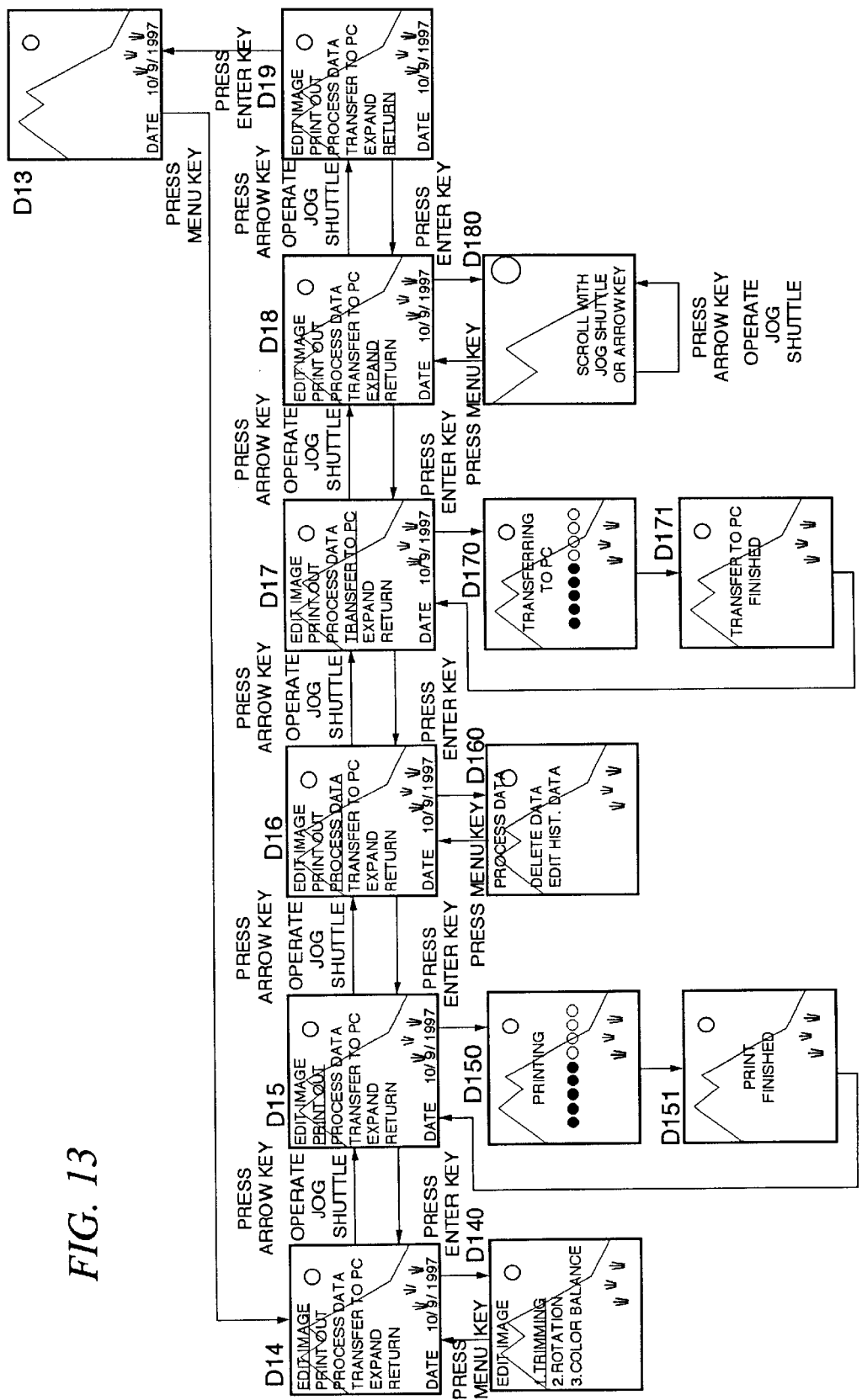
FIG. 13 is a view showing transitions of screen views for displaying and editing an image.
Figure 14:
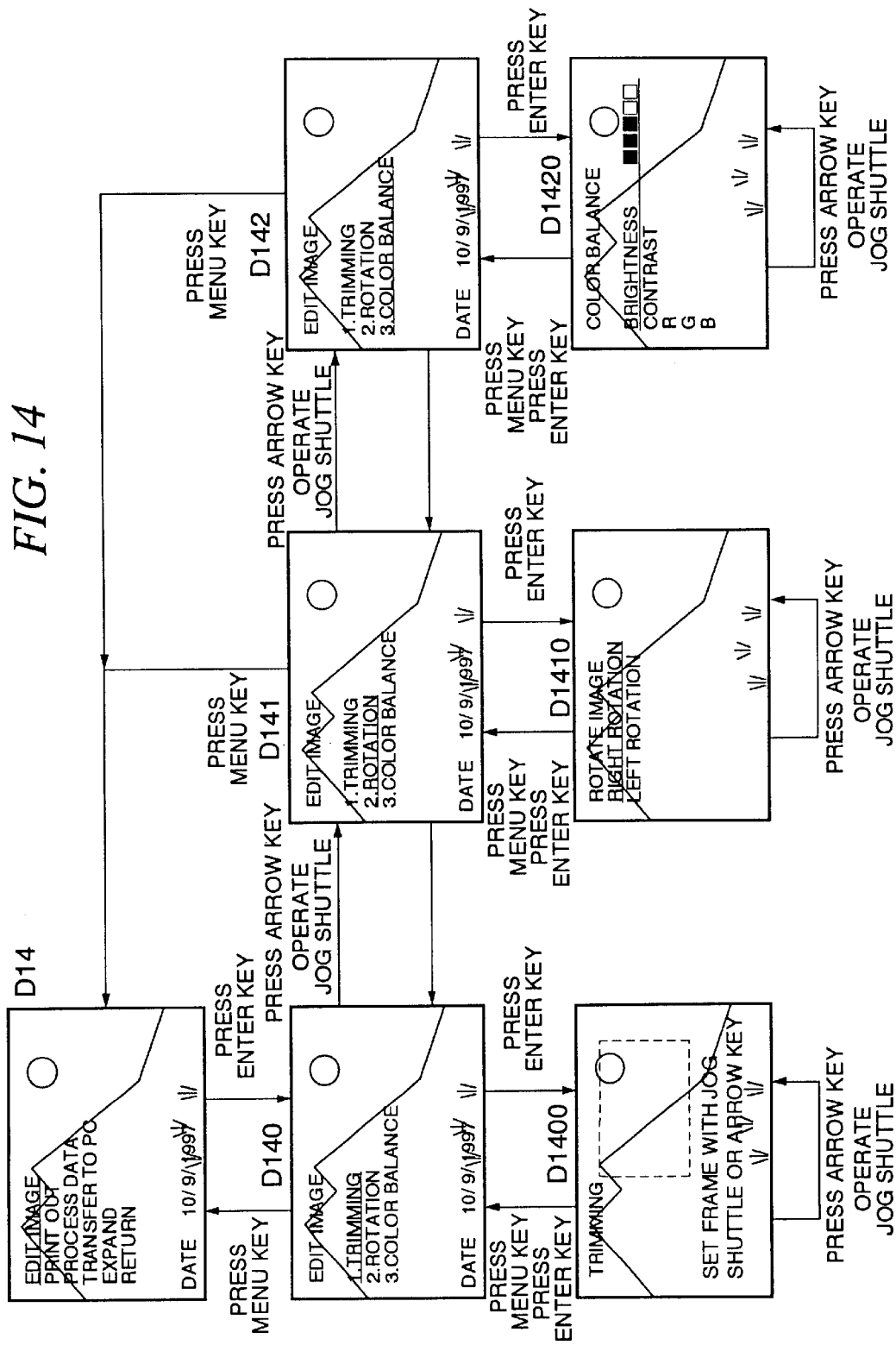
FIG. 14 is a view showing transitions of screen views for editing the image.

Referring to FIGS. 13 and 14, an operation for editing an image in the image display device will be explained. In the D13 screen, if the menu key 771 is pressed, a menu for editing an image (D14 screen) is displayed. As shown in the figures, the D14 screen shows five options: "edit image", "print out", "process data", "transfer to PC", and "expand". The one selected by the manipulation of the arrow key 791, 793, or the jog shuttle 78, is alternately displayed in cyclic order (D14 to D19 screens). In the D14 to D19 screens, if the enter key is pressed, the screen changes into a next hierarchy. Here, the enter key 772 is pressed in one of the D14 to D18 screens, the screen changes into each of D140 to D180 screens for indicating the next hierarchy. If the menu key 771 is pressed in one of the D140 to D180 screens, the state is returned to each of the D14 to the D18 screens for the preceding hierarchy.

If "edit image" is selected in the D14 screen, and the enter key 772 is pressed, the screen changes into the D140 screen in which an item for editing the image is selectable. In this screen, by the operation with the arrow key 791, 793, or jog shuttle 78, the screen changes into D141 and D142 screens in which a rotation and an adjustment of la color balance is selectable. In the D140 screen in which a trimming is selected, if the enter key 772 is pressed, the screen changes into a D1400 screen for trimming the image. In the D1400 screen, by the manipulation of the arrow key 791, 793, or the jog shuttle 78, a frame for trimming can be set up. When the enter key 772 is pressed in the D1400 screen, keeping the state that the frame for trimming is decided, the screen is returned to the D140 screen. If the menu key 771 is pressed in the D1400 screen, which cancels the frame setting, the screen returns to the D140 screen.

If the enter key 772 is pressed in the D141 screen, the screen is changed to an image edit screen D1410 for rotating the image. In the D1410 screen, the right rotation or left rotation is selected by the manipulation of the arrow key 791, 793 or jog shuttle. If the enter key 772 is pressed in the D1410 screen, the screen is returned to the D141 screen with keeping the state that the image is rotated into the right or left. Also, when the menu key 771 is pressed in the D1410 screen, it cancels the image rotation, and returns the screen into D141 screen.

If the enter key 772 is pressed in the D142 screen, the screen changes into a D1420 screen for setting the color balance. In the D1420 screen, the five items for the adjustment in brightness, contrast, R(red), G(green) and B(blue) are selectable by the operation with the arrow key 791, 793, or jog shuttle 78. In the case of adjusting the brightness, the decided brightness is displayed in a form just like a bar graph. The contrast, R, G, and B can be also adjusted in the same manner.

In the state of the D15 screen (print out), pressing the enter key 772 starts to print out, and the screen indicates the state of printing out (D150 screen). When the printout is finished, the screen indicates the finish of printout (D151 screen). In this state, the enter key 772 or the menu key 771 being pressed, the screen returns into D15 screen. If the enter key 772 is pressed in the D16 screen (in the state that the data processing is selected), the screen is changed to a D160 screen in which it is possible to delete the data and to edit the history data. The menu key being pressed 771 in the D160 screen, the screen returns to the D16 screen.

If the enter key 772 is pressed in the D17 screen (transfer to PC), the data starts to be transferred into the PC, and the screens indicates the data being transferred into PC (D170 screen). When the transfer into the PC is finished, the screen shows a message that the transfer is finished (D171 screen). In this state, if the enter key 772 or menu key 771 is pressed, the screen returns to the D17 screen. When the enter key 772 is pressed in the D18 screen (display expanded image), the screen changes into a D180 screen for displaying the expanded image in which the displayed image is expanded by 200%. The expanded image displayed in the background is scrolled by the operation with the jog shuttle 78, or arrow keys 791 to 794 in the D180 screen. Pressing the menu key 771 resets the expanding rate for displaying, and returns the screen into the D18 screen. The enter key 772 being pressed, the screen returns to the D13 screen.

History Data

Referring to FIGS. 15 and 16, the explanation is given to how the history data is recorded as a result of the above-described file transfer and image edit. In FIGS. 15 and 16 showing tables of the tag information and the history data of operations concerning the frame images stored in the magneto-optic disk 32. 1st to 5th columns show the tag information which is recorded in the memory card 8 at the photographing operation by the digital camera. In the case of transferring the image data from the memory card 8 to the magneto-optic disk 32, the tag information shown in the 1st column to 5th column are simultaneously transferred into the magneto-optic disk 32. A 6th column shows the history data which is to be recorded in the memory card 8 when the image is reproduced and displayed by the digital camera 1. A 7th column shows ID (identification) data of the magneto-optic disk 32 which is recorded when the image data is transferred from the memory card 8 to the magneto-optic disk 32. This ID data is recorded into both of the memory card 8 (transferring medium) and magneto-optic disk 32 (transferred medium). The ID information of the magnet-optic disk 32 is assigned in a formatting operation of the disk 32. A 9th column shows information on the date of image data transferring. As to the 8th column, 10th column and later columns, "0" is entered to each of them, and the memory area is secured. The 6th and 7th columns correspond with the history data M.

In the state of performing the browsing in the image display device 21 after transferring the data from the memory card 8 to the magneto-optic disk 32, if the history setup button H is pressed, number of pressing the button H is recorded in the 10th column. The value is incremented at every press of the history setup button H. Display time for the specified frame in the browsing operation is recorded in a 11th column. In the processing, the time is counted in seconds, and decimal fractions are rounded up. The latest date of the history setup button H being pressed, or the latest date of the picked image being displayed for twenty seconds or more, is recorded in a 12th column. Number of printing out is recorded in a 13th column. Date of printing is recorded in a 14th column. The latest date of the image data being transferred into the PC is recorded in a 15th column. Number of image editing is recorded in a 16th column, of which value is incremented at every operation of image editing. The latest date of editing is recorded in a 18th column. The value showing the type of the latest edit operation is recorded in a 17th column, which is recorded according to the table below.

TABLE 2

| Type of edit | Value |
| --- | --- |
| Trimming | 1 |
| Right rotation | 2 |
| Left rotation | 3 |
| Color balance Brightness | 4 |
| Color balance Contrast | 5 |
| Color balance R | 6 |
| Color balance G | 7 |
| Color balance B | 8 |

Ranks of image frames are recorded in the 8th column. The rank is an index for indicating importance of a specified image evaluated based on the operation for the image. The rank, which is derived from the following equation, is renewed and recorded at each of operations.

$$\text{Rank} = \text{Int}(\text{Sqrt}((\text{display time in camera})^2/10 + (\text{number of history setup button presses})^2 + (\text{time of displaying one image})^2/10 + (\text{number of printing})^2 + (\text{number of editing})^2)) \quad [\text{Equation 1}]$$

In the above equation, the rank is in grades from 1 to 10, so that, if the rank is in excess of 10, it is rounded to 10.

The above explanation gives an example of deciding the rank. As to an image which has already been printed out, the image is not necessarily stored into the magneto-optic disk 32. In view of such an aspect, the rank can be decided by the following equation:

$$\text{Rank} = \text{Int}(\text{Sqrt}(\text{Abst}((\text{display time in camera})^2/10 + (\text{number of history setup button presses})^2 + (\text{time of displaying one image})^2/10 - (\text{number of printing})^2 + (\text{number of editing})^2))) \quad [\text{Equation 2}]$$

Definitions of the functions are as follows:

Int( ) Function which indicates the integer value under the argument value

Sqrt( ) Function which indicates the square root of the argument value

Abst( ) Function which indicates the absolute value of the argument value

Figure 17:
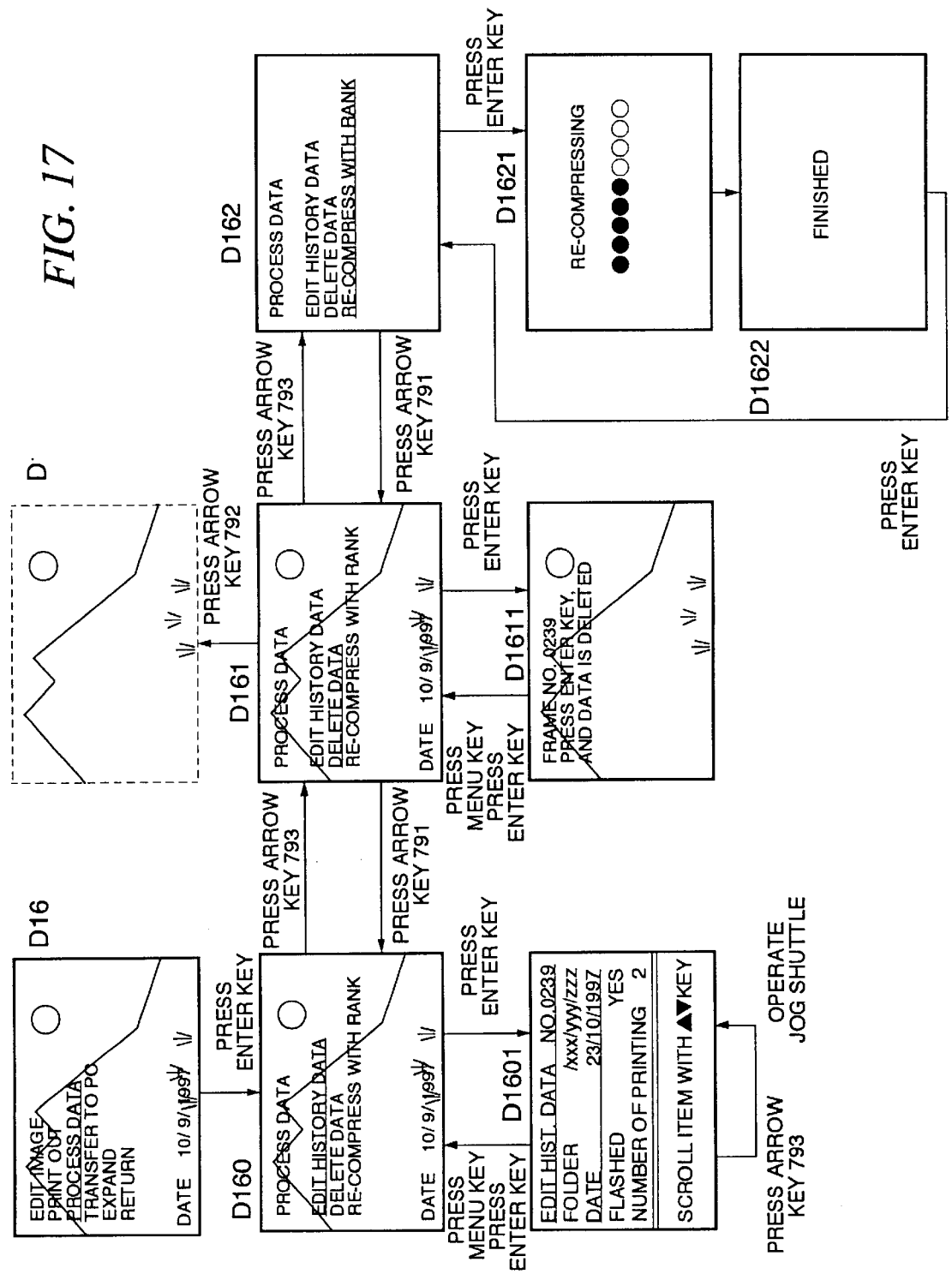
FIG. 17 is a view showing transitions of screen views for editing history data.

The history data is assigned by the above-described procedure, and remedies for errors in the operation are also demanded. For this reason, the image display device 21 has a function for editing history data. FIG. 17 is a view showing transitions of screen views for editing the history data. If the arrow key 791, 793 or jog shuttle 78 are manipulated in the initial screen D1 (FIG. 12), and if the enter key 772 is pressed in the D16 screen in which the data processing is selected, the screen changes into the data processing screen D160. In the D160 screen, one of the options (the edit of history data, deletion of data, and re-compression in accordance with the rank) can be selected. Here, if the edit of history data is selected, and the enter key 772 is pressed, the screen changes into a D1601 screen for editing the history data. In the D 1601 screen, the screen is scrolled by the manipulation of the arrow keys 791 to 794, or jog shuttle 78, Thereby all of the data in the 2nd and later columns of the history table in FIG. 15 can be edited.

Figure 18:
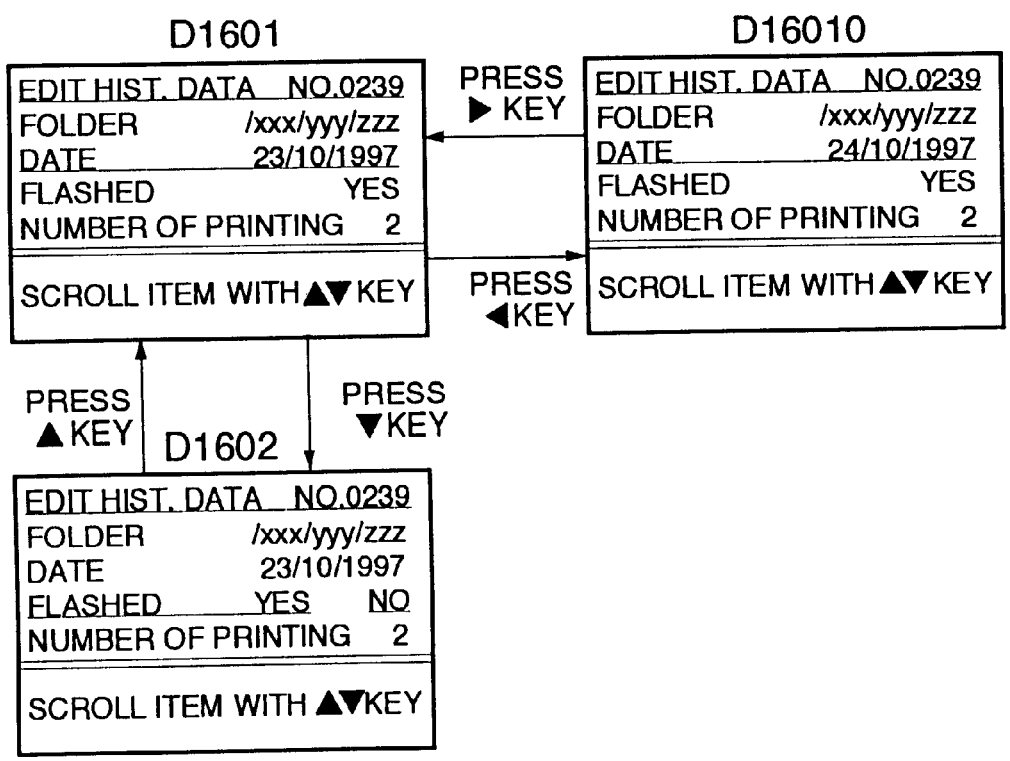
FIG. 18 is a view showing transitions of screen views for editing the history data.

FIG. 18 shows an example of editing. As shown in the figure, pressing the arrow key 794 in the D1601 screen makes an increment of the photographing date (D16010 screen). Following that, every press of the arrow key 794 sequentially makes an increment of the photographing date. On the other hand, every press of the arrow key 792 in the D16010 screen sequentially makes a decrement of the photographing date. Further, the arrow key 793 being pressed in the D1601 screen, the screen changes into the D1602 screen of an edit for a next item "Flashed: YES/NO". As in the case of the D1601 screen, the condition of flashed, or not flashed is set up by the arrow keys 792 and 794.

Going back to FIG. 17, the explanation shows the case of deleting data. The arrow key 793 being pressed in the D160 screen, the screen changes into a D161 screen for deleting the data. The enter key 772 being pressed in the D161 screen, the screen changes into the alarm screen D1611, in which if the enter key 772 is pressed, the corresponding image data including its tag information and history data are deleted. If the menu key 771, or enter key 772 is pressed in the D611 screen, the screen changes into the D161 screen without deleting the image data. In the deletion operation, as to the image data of which the rank value in the 8th column of the history table is four or more, its file size is decreased by increasing the compression rate, thereby saving said data. This is a countermeasure against an error operation which completely erases important data. In this procedure, the compression rate is altered as shown in the table below in accordance with the rank, which is performed by altering the compression rate of the JPEG file. In addition to the compression rate, it is possible to apply the way of decreasing the file size.

TABLE 3

| Rank | |
| --- | --- |
| 4 | Increase the file compression rate by 400% |
| 5 and 6 | Increase the file compression rate by 200% |
| 7 or more | Increase the file compression rate by 50% |

The compressed image data (image data which is to be deleted) is saved together with its tag information and history data into an area in the file management part 51 of the magneto-optic disk 32. However, the thumbnail image data is deleted since it can be produced from the compressed image. The data which has been deleted, can be recovered by pressing the arrow key 792 in the D161 screen (D1612 screen). For example, if the data area for the image frame No.206 becomes blank in the image deletion operation, and when the next file is transferred, its data is stored in the blank area No.206.

The arrow key 793 being pressed in the D161 screen, the screen changes into a D162 screen for re-compression the data in accordance with the rank. The re-compression procedure is performed in order to alter the compression rate between the image having a greater probability of being used (higher-rank image), and the image having a smaller probability of being used (lower-rank image). Therefore, the limited disk space for storing is efficiently utilized. If the enter key is pressed in the D162 screen, the screen displays the message of the image being re-compressed in the D1621 screen. When the re-compression procedure is finished, the screen changes into a D1622 screen.

Figure 19:
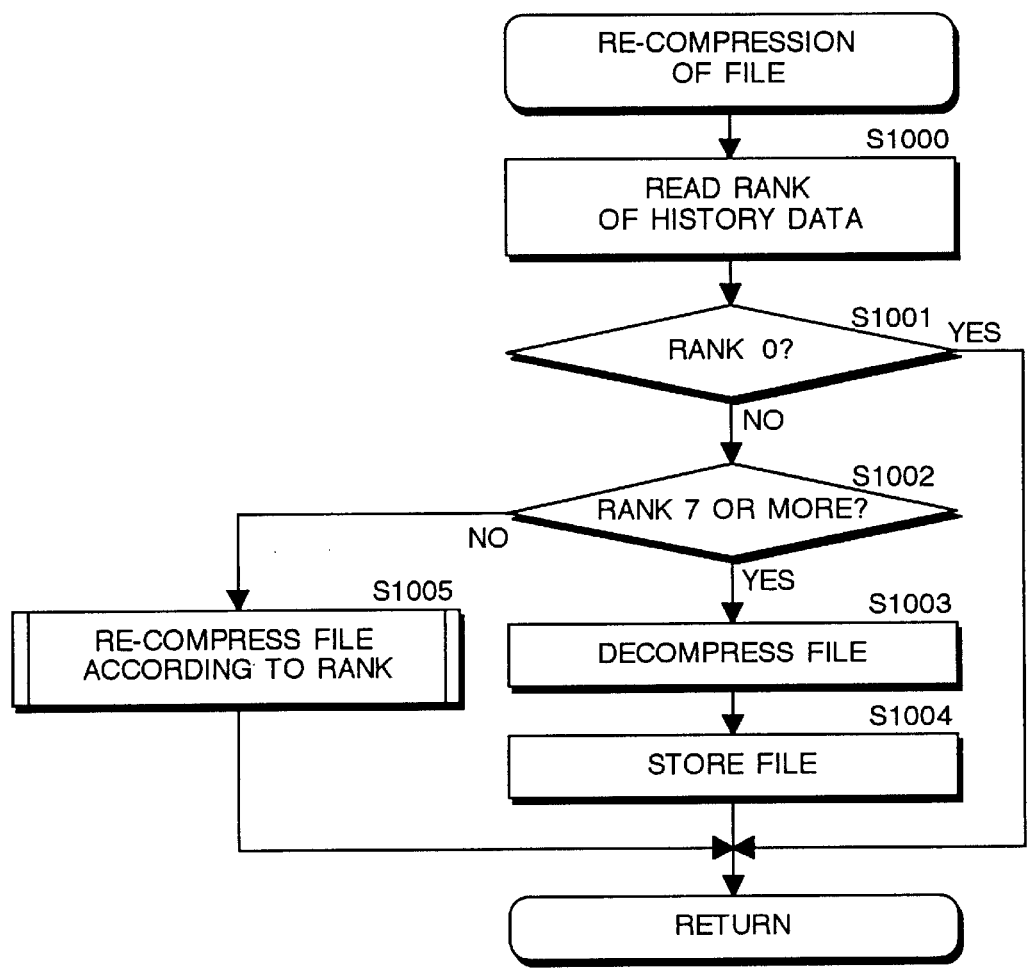
FIG. 19 is a flowchart of a processing for re-compressing an image file.

With reference to a flowchart of FIG. 19, the re-compression processing of the image file is explained. In the re-compression processing in the D162 screen, the image file is read out one by one, and a following processing is performed for all of the recorded image files. Initially, as to the image file, its rank item is read (S1000). If the rank is 0 (YES in S1001), succeeding steps are bypassed, and the processing is performed for the next image file. If the rank is 7 or more (YES in S1002), the image file is decompressed (S1003) and the decompressed file is stored (S1004). This is because the important file is frequently used. This processing allows the omission of the processing for decompressing the image data in use of said image file. If the rank of the image file is 1 to 6 (NO in S1002), the processing is performed for altering the re-compression rate in accordance with the rank (S1005) as shown in the table below.

TABLE 4

| Rank | Processing |
| --- | --- |
| 1 | Save the file in the compression rate risen 100% |
| 2 and 3 | Save the file in the compression rate risen 75% |
| 4, 5 and 6 | No processing |

Retrieval Screen

Figure 20:
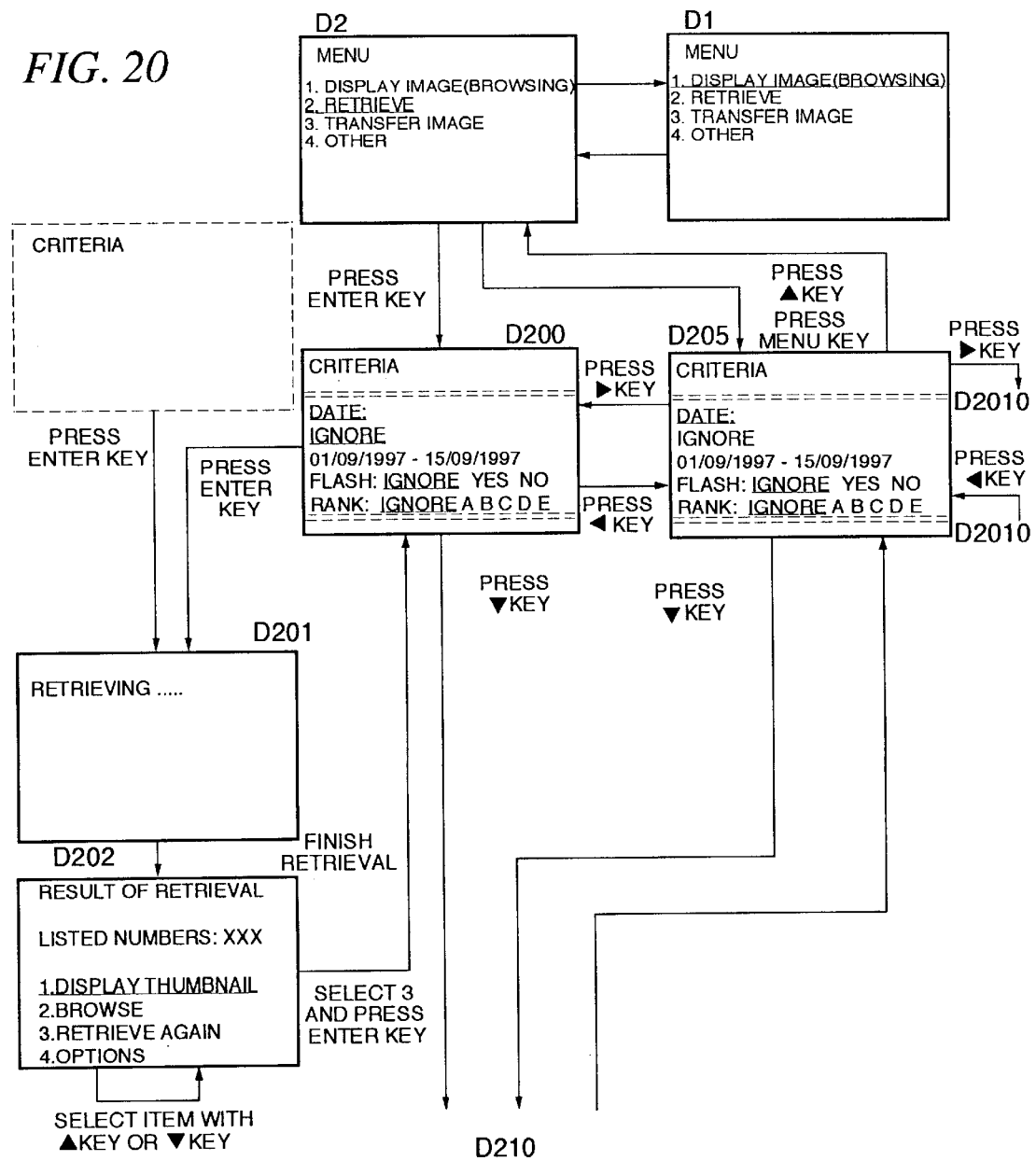
FIG. 20 is a view showing transitions of screen views for retrieval.
Figure 21:
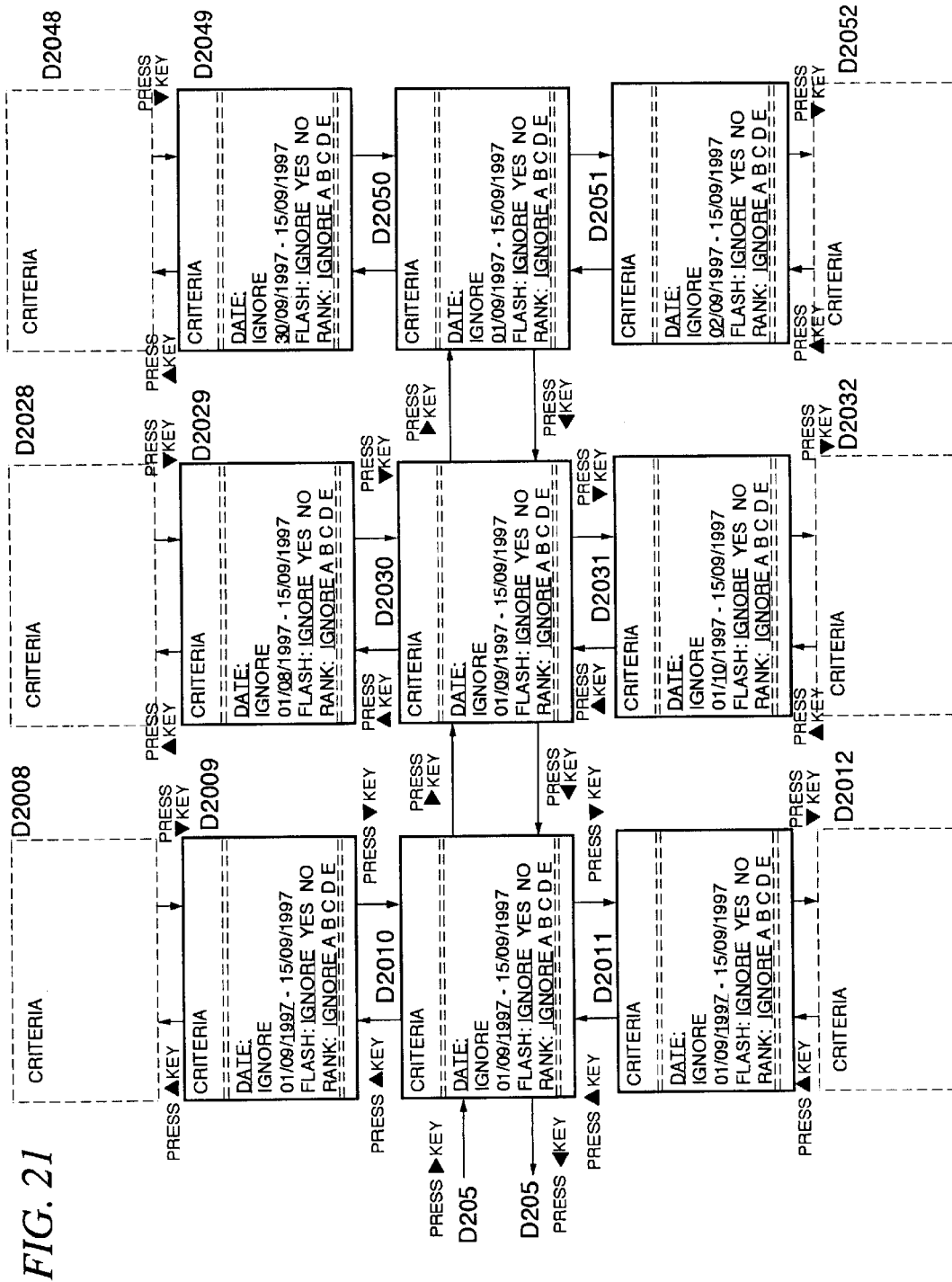
FIG. 21 is a view showing transitions of screen views for retrieval.
Figure 22:
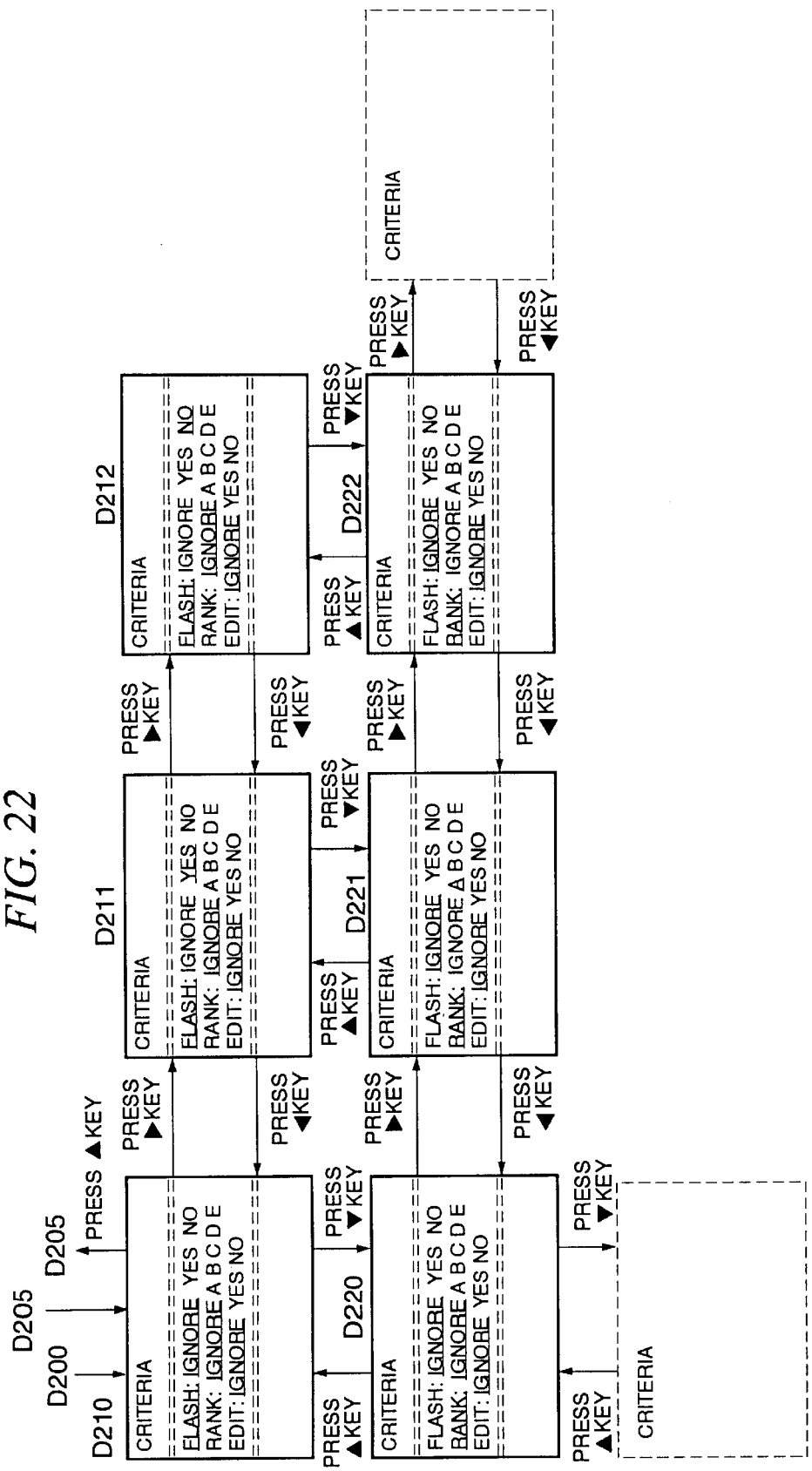
FIG. 22 is a view showing transitions of screen views for retrieval.

Referring to FIGS. 20 to 22 showing the transitions of screen views for retrieval, a retrieval procedure in the image display device 21 is explained. The operation with the arrow key 791, 793, or jog shuttle 78 in the main menu screen D1, makes a selection for retrieval (D2 screen). The enter key 772 being pressed in the D2 screen, the screen changes into a D200 screen for setting retrieval criteria. In the D200 screen, the retrieval criteria concerning the photographing, date are set. In the D200 screen shown in the figure, the selection is made for photographing date=ignore. "Ignore" in this case means that the item is excluded from the retrieval criteria. The arrow key 794 being pressed in the 200 screen, the screen changes into D205 screen which sets the criteria for the photographing date of the data to be retrieved. The arrow key 794 being pressed in the D205 screen, the screen changes into a D2010 screen for setting the lower limit "Year" in a range of the photographing date. Then, at every press of the arrow key 794, the screen is changed into each of the screens: D2030 for setting the lower limit "Month" in a range of the photographing date, D2050 for setting the lower limit "Day" in a range of the photographing date, an unshown screen for setting the upper limit "Year" in a range of the photographing date, an unshown screen for setting the upper limit "Month" in a range of the photographing date, and an unshown screen for setting the upper limit "Day" in a range of the photographing date. Also, the arrow key 792 being pressed, the screen changes into the screen for setting "Year", "Month", and "Day" in the reverse screen transition of the above-mentioned one.

In the D2010 screen for setting for setting the lower limit "Year" in a range of the photographing date, the displayed year is decremented one by one at every press of the arrow key 791 (D2009 and D2008 screens). To the contrary, the displayed year is incremented one by one at every press of the arrow key 793 in the D2010 screen (D2011 and D2012 screens). The same also goes for the setting of month and day (D2029, D2028, D2031, D2032, D2049, D2048, D2051, and D2052 screens).

The arrow key 793 being pressed in the D200 or D205 screen, the screen changes into a D210 screen for setting retrieval criteria for the condition of the flash (flashed or not flashed). The retrieval criteria for the flash are altered between "YES (flashed)" and "NO (not flashed)" at every press of the arrow key 794 in the D210 screen, and the criteria are reversely altered by pressing the arrow key 792 (D211 and D212 screens). An arrow key 793 being pressed in the D210, D211 and D212 screens, the screen changes into D220, D221, and D222 screens for setting the next item "Rank". In said D220, D221, and D222 screens, the screen changes into the one for selecting the rank from A to E by a similar operation as the above. The correspondences between the rank displayed in the retrieval screen and the rank of the data stored in the magneto-optic disk 32 are as follows:

TABLE 5

| Rank displayed in the retrieval screen | Rank of the stored data |
| --- | --- |
| A | 8 or more |
| B | 5 or more |
| C | 4 or more |
| D | 3 or more |
| E | 2 or more |

Figure 23:
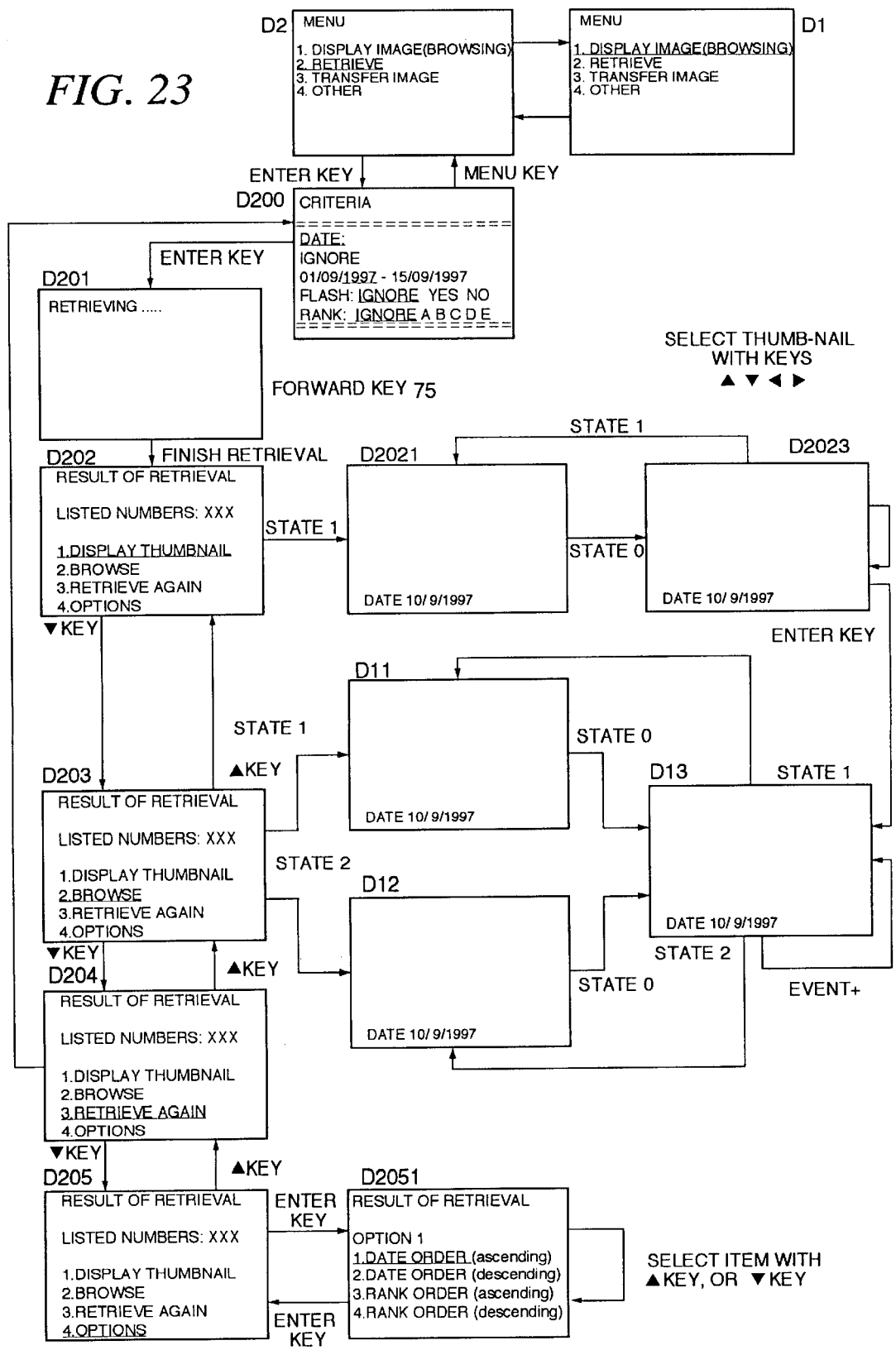
FIG. 23 is a view showing transitions of screen views after retrieval.

Next, with reference to FIG. 23, the transition of the screens displayed after the retrieval is explained. In the D200, D205, S210 and D220 screens, the enter key being pressed, the screen changes into a D201 screen for performing the retrieval. Then, the retrieval operation is performed. After the retrieval is completed, the screen changes into a D202 screen for indicating the results of the retrieval, thereby displaying number of retrieved data (listed number). For example, in the retrieval criteria: Photographing date= 15/09/1997 to 15/09/1997, Rank=C, Other items=ignore, only the image data in the frame No.116 is found, and the number of retrieved data is displayed as "1".

In the D202 screen, as to the result of the retrieval, four modes: thumbnail display, browsing, re-retrieving, and options can be selected. Each of modes is selected by the arrow keys 791 and 793 (D202 to D205 screens). The enter key 772 being pressed in the screen of selecting "Options" in the D205 screen, the screen changes into the option mode screen D2051 for sorting methods of the retrieval results. In the figure, the screen concerns order of displaying the retrieval results. In the D2051 screen, the selection a is made for "1": Display the results in ascending date order. The arrow keys 791 and 793 being pressed, the selection is made for other items, "2": Display the results in descending date order, "3": Display the results in: ascending rank order, and "4": Display the results in descending rank order. If the enter key is pressed when one of the items is selected, the order of displaying the retrieval results is decided. After that, the screen changes into the D205 screen. In the D205 screen, the screen changes into a D204, D203, or D202 screen at every press of the arrow key 791.

In the D202 screen, if the jog shuttle is turned into State 1, the thumbnail data is displayed based on the retrieval results at every ninth frame in the order of photographing date (in the case that 1:Date order (ascending) is selected in the D2051 screen) (browsing mode; D2021 screen). Said nine frames are arranged in the order of photographing date from upper-left, upper-middle, upper-right, . . . , to lower-right. In the D2021 screen for the browsing mode, turning the jog shuttle into State 0, stops browsing, and maintains the state that the nine-frame images displayed at that time (D2023 screen). At the time, the upper-left image is selected out of the nine-frame thumbnail image. In the D2023 screen, pressing the arrow keys 791 to 794, moves the image which is selected out of the nine-frame thumbnail image. Turning the jog shuttle into State 1 again, goes into the browsing mode. Also, turning the jog shuttle into State 3 in the D2023 screen, goes into the browsing mode (reverse order). In the D2023 screen, if the enter key is pressed, the screen changes into the D13 screen. If the Event+ occurs in the D2023 screen, the screen displays the next following nine-frame thumbnail images; if the Event– occurs, the screen displays the immediately preceding nine-frame thumbnail images. Although this explanation gives an example of screen transitions by the manipulation of the jog shuttle, the same screen transitions also go for the manipulation of the keys 72 to 76.

In the D203 screen, if the jog shuttle is turned into State 1, the high-resoliution image is displayed based on the retrieval results frame by frame in the order of photographing date (browsing mode; D11 screen). On the other hand, in the D203 screen, if the jog shuttle is turned into State 2, the thumbnail data is displayed frame by frame in the order of photographing date (high speed browsing mode; D12 screen). The succeeding screen transitions have already been explained referring to FIG. 12.

Processing at Start-up

Figure 24:
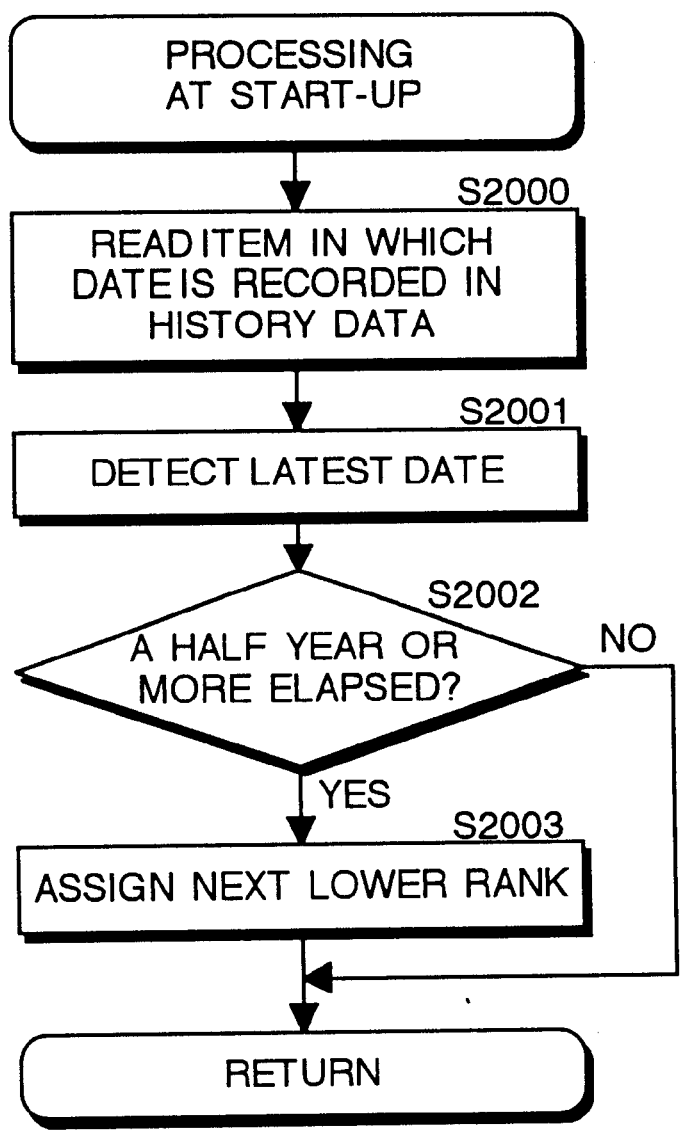
FIG. 24 is a flowchart showing a processing at start-up.

Now a processing at start-up is explained with reference FIG. 24. In the image display device 21, checking the history data of all files at start-up, the processing assigns lower rank to the file which has not been manipulated for a predetermined time period. At start-up, if the magneto-optical disk 32 is placed, firstly the processing reads the item (the 2nd, 9th, 12th, 14th and 18th columns in FIGS. 15 and 16) in which the date is recorded in the history data (S2000). Secondly, the procedure goes to a step of detecting the latest date (S2001). If the date is earlier than a half year (YES in S2002), the procedure goes to a step S2003 for assigning the next lower rank. As to the frame of which rank is lowered, if it is edited again, the value of its rank is also calculated again. Thus, the history data is properly renewed.

As described above, according to the present invention, data concerning operations and processing for image files are recorded as history data. Thereby, a desired image is found based on the history data. Further, an image is found based on a combination of photographing condition in a photographing operation, and the history data about the operations executed for the image file. Therefore, the image retrieval system allows the image to be efficiently, exactly, and conveniently found without a trouble of assigning key information to the image file.

While there has been shown what is considered to be the preferred embodiment of the present invention, it will be manifest that many changes and modifications may be made therein without departing from the essential spirit of the invention. It is intended, therefore, in the annexed claims to cover all such changes and modifications as may fall within the true scope of the invention.

What is claimed is:

1. An image retrieval system which retrieves a plurality of images recorded in a recording medium, comprising:

an indicator which commands a processing to be executed for image data;

a setter which sets up history data for retrieving said image in accordance with the processing commanded by the indicator, wherein said history data being data about image editing for each image; and a retrieval device which retrieves the image based on said history data.

2. The image retrieval system as claimed in claim 1, wherein said setter further assigns a priority in said history data.

3. The image retrieval system as claimed in claim 2, wherein said setter assigns a lower priority in said history data for the image which has been printed out.

4. The image retrieval system as claimed in claim 1, wherein said setter sets up history data according to a time for displaying the image.

5. The image retrieval system as claimed in claim 4, wherein said setter resets the history data when the indicator provides no command for an image in the state that the image is kept on being displayed for a predetermined time or more.

6. The image retrieval system as claimed in claim 1, wherein said setter sets up history data according to number of editing an image.

7. The image retrieval system as claimed in claim 1, further comprising a setting section which arbitrarily sets up said history data.

8. The image retrieval system as claimed in claim 1, further comprising a recorder which records the history data set by the setter into the recording medium.

9. The image retrieval system as claimed in claim 1, wherein the system retrieves the image based on photographing conditions of the image.

10. The image retrieval system as claimed in claim 9, wherein the system sorts an image which is retrieved based on said history data and said photographing conditions, and displays said image.

11. The image retrieval system as claimed in claim 1, having a browsing function which sequentially displays the retrieved image.

12. The image retrieval system in claim 1, wherein the system is capable of holding a first recording medium which records a plurality of images photographed by a photographing apparatus, and a second recording medium into which the image recorded in said first recording medium is transferred and recorded.

13. The image retrieval system as claimed in claim 12, wherein the setter sets up history data which indicates that the image is transferred, and recorded from said first recording medium into said second recording medium.

14. The image retrieval system as claimed in claim 1, further comprising an interface circuit which transfers the image into an external device, wherein the setter sets up history data which indicates that the image is transferred from the image retrieval system into the external device.

15. The image retrieval system as claimed in claim 1, comprising a power source circuit which interrupts a power supply into the system after a predetermined time, wherein the setter corrects said history data when the power source circuit interrupts the power supply.

16. An method for retrieving an image which is recorded in a recording medium, comprising the following steps:

a step for commanding a processing to be executed for image data;

a step for setting history data to retrieve said image in accordance with the processing command, wherein said history data being data about image editing for each image; and a step for retrieving the image based on said history data.

17. An image photographing apparatus comprising:
an image sensor;
a recording medium which records images photographed by the image sensor;
a reproducer which reproduces images recorded in the recording medium;
a timer which counts a time for displaying the image; and,
a recorder which records data based on said time for displaying the image, into the recording medium correspondent with the image.

18. The image photographing apparatus as claimed in claim 17, said data based on the time for displaying the image is used for retrieving said image.

19. An image retrieval system which retrieves a plurality of images recorded in a recording medium, comprising:
an indicator which commands a processing to be executed for image data;
setter which sets up history data for retrieving said image in accordance with the processing commanded by the indicator, wherein said history data being data about at least one of image data transfer and image editing for each image; and
a retrieval device which retrieves the image based on said history data set up by said setter and a history data area recorded on the recording medium about said plurality of images.

20. A method for retrieving an image which is recorded in a recording medium, comprising the steps of:
commanding a processing to be executed for image data;
setting history data to retrieve said image in accordance with the processing command, wherein said history data being data about at least one of image data transfer and image editing for each image; and
retrieving the image based on said history data which is set up and history data which is recorded on the recording medium about said image.

21. An image retrieval system according to claim 1, wherein the processing to be executed for the image data is a reproducing processing.

22. An image retrieval system which retrieves a plurality of images recorded in a recording medium, comprising:
an indicator which commands a processing to be executed for image data;
a setter which sets up history data for retrieving said image in accordance with the processing commanded by the indicator, wherein said history data being data about at least one of image data transfer and image editing for each image;
a retrieval device which retrieves the image based on said history data; and
update device updating said history data based upon the processing for the image data.

23. An method for retrieving an image which is recorded in a recording medium, comprising following steps:
a step for commanding a processing to be executed for image data;
a step for setting history data to retrieve said image in accordance with the processing command, wherein said history data being data about at least one of image data transfer and image editing for each image;
a step for retrieving the image based on said history data; and
a step for updating said history data based upon the processing for the image data.

24. An image retrieval system which retrieves a plurality of images recorded in a recording medium, comprising:
an indicator which commands a processing to be executed for image data;
a setter which sets up history data for retrieving said image in accordance with the processing commanded by the indicator, wherein said history data being data about at least one of image data transfer and image editing for each image;
a retrieval device which retrieves the image based on said history data set up by said setter and a history data area recorded on the recording medium about said plurality of images; and
an update device which updates said history data area based upon the processing for the image data.

25. A method for retrieving an image which is recorded in a recording medium, comprising the steps of:
commanding a processing to be executed for image data;
setting history data to retrieve said image in accordance with the processing command, wherein said history data being data about at least one of image data transfer and image editing for each image;
retrieving the image based on said history data which is set up and history data which is recorded on the recording medium about said image; and
updating said history data which is recorded based upon the processing for the image data.

26. An image retrieval system which retrieves a plurality of images recorded in a recording medium, comprising:
a selector which selects one of a plurality of reproducing processes to be executed for image data;
a setter which sets up different history data for retrieving said image in accordance with the process selected by the selector; wherein said history data being data about at least one of image data transfer and image editing for each image; and
a retrieval device which retrieves the image based on said history data.

27. An image retrieval method for retrieving a plurality of images recorded in a recording medium comprising the steps of:
selecting one of a plurality of reproducing processes to be executed for image data;
setting up different history data for retrieving the image based upon the reproducing processes selected; wherein said history data being data about at least one of image data transfer and image editing for each image; and
retrieving the image based upon the history data.

* * * * *